(12) United States Patent
Wetsch

(10) Patent No.: US 12,447,709 B2
(45) Date of Patent: Oct. 21, 2025

(54) SYSTEMS FOR PRODUCING DUNNAGE

(71) Applicant: Pregis LLC, Chicago, IL (US)

(72) Inventor: Thomas D. Wetsch, Naples, FL (US)

(73) Assignee: Pregis LLC, Chicago, IL (US)

( * ) Notice: Subject to any disclaimer, the term of this patent is extended or adjusted under 35 U.S.C. 154(b) by 0 days.

(21) Appl. No.: 18/340,805

(22) Filed: Jun. 23, 2023

(65) Prior Publication Data
US 2023/0415445 A1    Dec. 28, 2023

Related U.S. Application Data

(60) Provisional application No. 63/355,521, filed on Jun. 24, 2022.

(51) Int. Cl.
*B31D 5/00* (2017.01)

(52) U.S. Cl.
CPC .... *B31D 5/0052* (2013.01); *B31D 2205/0023* (2013.01); *B31D 2205/0035* (2013.01); *B31D 2205/0047* (2013.01); *B31D 2205/0058* (2013.01); *B31D 2205/0082* (2013.01); *B31D 2205/0094* (2013.01)

(58) Field of Classification Search
CPC .......... B31D 5/0039; B31D 2205/0011; B31D 2205/0047; B31D 2205/0058; B31D 5/00
See application file for complete search history.

(56) References Cited

U.S. PATENT DOCUMENTS

| 4,750,896 A | 6/1988 | Komaransky et al. |
| 4,983,063 A * | 1/1991 | Phillips ............... B62J 1/08 297/215.14 |
| 5,105,703 A * | 4/1992 | Kondo .................. B41J 11/70 83/636 |
| 5,123,889 A | 6/1992 | Armington et al. |
| 5,203,083 A | 4/1993 | Domonoske |

(Continued)

FOREIGN PATENT DOCUMENTS

| DE | 10204506 A1 | 8/2003 |
| EP | 1762375 A2 | 3/2007 |

(Continued)

OTHER PUBLICATIONS

International Search Report and Written Opinion for International Application No. PCT/US23/69030, filed Jun. 23, 2023, mailed Apr. 2, 2024.

*Primary Examiner* — Gloria R Weeks
(74) *Attorney, Agent, or Firm* — Fox Rothschild LLP

(57) ABSTRACT

A dunnage conversion machine includes a drive mechanism configured to deform a stock material into dunnage. The drive mechanism may include a roller with an outer surface having a first shape, and another roller having an outer surface with a second shape different than the first shape. The dunnage conversion machine also may include a cutting mechanism that includes an anvil having a curvilinear surface, and a cutting portion, with the anvil and the cutting portion being configured to cut the dunnage. The dunnage conversion machine also may include an inlet chute configured to feed the stock material to the dunnage conversion machine. The inlet chute may include a protrusion located within an interior channel of the inlet chute and configured to restrict larger objects, such as the fingers and hands of an operator, from moving down the interior channel.

18 Claims, 24 Drawing Sheets

(56) References Cited

U.S. PATENT DOCUMENTS

| | | | |
|---|---|---|---|
| 5,322,477 A | 6/1994 | Armington et al. | |
| 5,593,376 A | 1/1997 | Armington et al. | |
| 5,607,383 A | 3/1997 | Armington et al. | |
| 5,658,229 A | 8/1997 | Armington et al. | |
| 5,674,172 A | 10/1997 | Armington et al. | |
| 5,709,642 A | 1/1998 | Ratzel et al. | |
| 5,749,539 A | 5/1998 | Ratzel et al. | |
| 5,803,893 A * | 9/1998 | Armington | B31D 5/0047 |
| | | | 248/676 |
| 5,891,009 A | 4/1999 | Ratzel et al. | |
| 5,908,375 A | 6/1999 | Simmons et al. | |
| 5,938,580 A | 8/1999 | Siekmann | |
| 5,997,461 A | 12/1999 | Armington et al. | |
| 6,033,353 A * | 3/2000 | Lencoski | B31D 5/0047 |
| | | | 493/464 |
| 6,080,097 A * | 6/2000 | Ratzel | B23Q 5/348 |
| | | | 493/464 |
| 6,135,939 A | 10/2000 | Lencoski et al. | |
| 6,168,560 B1 | 1/2001 | Pluymaekers et al. | |
| 6,183,586 B1 | 2/2001 | Heidelberger | |
| 6,277,459 B1 * | 8/2001 | Lencoski | B65D 81/09 |
| | | | 428/218 |
| 6,311,596 B1 * | 11/2001 | Ratzel | B31D 5/0047 |
| | | | 493/372 |
| 6,398,703 B1 | 6/2002 | Keller | |
| 6,402,674 B1 | 6/2002 | Simmons, Jr. et al. | |
| 6,416,451 B1 | 7/2002 | Ratzel et al. | |
| 6,561,964 B1 * | 5/2003 | Armington | B31D 5/0047 |
| | | | 493/464 |
| 7,163,503 B2 | 1/2007 | Toth | |
| 7,186,208 B2 | 3/2007 | Demers et al. | |
| 7,503,247 B2 * | 3/2009 | Cavanagh | B26D 1/035 |
| | | | 83/563 |
| 7,585,268 B2 * | 9/2009 | Cheich | B65D 83/0805 |
| | | | 493/464 |
| 7,788,884 B2 | 9/2010 | Cheich et al. | |
| 7,819,599 B2 * | 10/2010 | Kobayashi | B41J 11/009 |
| | | | 400/621 |
| 7,955,245 B2 * | 6/2011 | Cheich | B31D 5/0047 |
| | | | 493/464 |
| 8,419,606 B2 | 4/2013 | Carlson et al. | |
| 8,562,229 B2 * | 10/2013 | Inaba | B26D 1/085 |
| | | | 400/621 |
| 8,708,882 B2 | 4/2014 | Chan et al. | |
| 9,994,343 B2 * | 6/2018 | Wetsch | B65B 41/16 |
| 10,814,578 B2 | 10/2020 | Schalk et al. | |
| 10,926,506 B2 | 2/2021 | Wetsch et al. | |
| 10,940,658 B2 * | 3/2021 | Lemmens | B26D 1/08 |
| 10,974,858 B2 * | 4/2021 | Wetsch | B65B 51/225 |
| 11,207,860 B2 | 12/2021 | Cheich | |
| 11,331,873 B2 | 5/2022 | Peterlini | |
| 11,370,190 B2 * | 6/2022 | Schalk | B26F 1/10 |
| 11,491,756 B2 | 11/2022 | Christman et al. | |
| 2003/0084769 A1 * | 5/2003 | Keller | B26D 1/08 |
| | | | 83/411.5 |
| 2003/0139272 A1 | 7/2003 | Simmons | |
| 2007/0199422 A1 * | 8/2007 | Kawaguchi | B26D 1/0006 |
| | | | 83/636 |
| 2009/0082187 A1 | 3/2009 | Cheich et al. | |
| 2009/0165625 A1 * | 7/2009 | Ishii | B26D 7/025 |
| | | | 270/58.08 |
| 2010/0146795 A1 * | 6/2010 | Houle | B26D 3/169 |
| | | | 30/92 |
| 2011/0053744 A1 | 3/2011 | Wetsch et al. | |
| 2011/0061986 A1 | 3/2011 | Orsini et al. | |
| 2011/0281711 A1 * | 11/2011 | Chan | B31D 5/0043 |
| | | | 493/464 |
| 2012/0027496 A1 * | 2/2012 | Mochida | B41J 11/70 |
| | | | 400/621 |
| 2013/0255457 A1 * | 10/2013 | Yazawa | B26D 7/0006 |
| | | | 83/55 |
| 2013/0272769 A1 * | 10/2013 | Yazawa | B41J 11/70 |
| | | | 400/621 |
| 2014/0155241 A1 | 6/2014 | Cheich et al. | |
| 2017/0066215 A1 | 3/2017 | Cheich et al. | |
| 2017/0095991 A1 * | 4/2017 | Wetsch | B31D 5/0039 |
| 2018/0297804 A1 | 10/2018 | Dominak et al. | |
| 2018/0326689 A1 | 11/2018 | Wetsch et al. | |
| 2019/0091959 A1 * | 3/2019 | Lemmens | B26D 1/08 |
| 2019/0176431 A1 | 6/2019 | Carlson et al. | |
| 2020/0039170 A1 | 2/2020 | Cheich et al. | |
| 2020/0139660 A1 * | 5/2020 | Corbin | B31D 5/0043 |
| 2020/0180256 A1 * | 6/2020 | Cheich | B31D 5/0047 |
| 2021/0023808 A1 | 1/2021 | Demers | |
| 2022/0048270 A1 | 2/2022 | Orsini et al. | |
| 2024/0001639 A1 | 1/2024 | Wetsch et al. | |

FOREIGN PATENT DOCUMENTS

| | | |
|---|---|---|
| GB | 2508267 A | 5/2014 |
| WO | 2007103466 A2 | 9/2007 |

\* cited by examiner

SYSTEMS FOR PRODUCING DUNNAGE

CROSS-REFERENCE TO RELATED APPLICATIONS

The present application claims the benefit under 35 U.S.C. § 119(e) of U.S. Provisional Application No. 63/355,521, filed Jun. 24, 2022, the contents of which are incorporated by reference herein in their entirety.

TECHNICAL FIELD

The present disclosure relates to systems that convert paper stock and other materials into dunnage for use as packing material.

BACKGROUND

Paper-based protective packaging, or dunnage, is produced by crumpling or otherwise deforming paper stock. More specifically, paper dunnage is produced by running a generally continuous strip of paper through a dunnage conversion machine. The continuous strip of paper can be provided from, for example, a roll of paper or a fanfold stack of paper. The dunnage conversion machine converts the stock material into a lower density dunnage material using, for example, opposing rollers between which the stock material is passed. The rollers grip and pull the stock material from the roll or stack, and deform the stock material as the material passes between the rollers. The resulting dunnage can be cut into desired lengths to effectively fill a void space within a container holding a product. The dunnage material may be produced on an as-needed basis for an induvial or machine performing packing operations.

The ability to smoothly and continuously feed the paper stock from the stack or roll is important to the proper and efficient operation of the dunnage conversion machine. Jamming and other interruptions in the flow of paper stock supplied to the dunnage conversion machine can prevent the machine from producing dunnage at the required rate, which in turn can cause delays in packaging and shipping operations that rely on a ready supply of dunnage. Frequent jamming also can result in damage to the dunnage conversion machine, and increased maintenance costs.

The ability to cleanly and repeatedly cut the dunnage also is important to the proper and efficient operation of the dunnage conversion machine. For example, the cutting blade requires replacement on a regular basis, to help ensure that the cutting edge remains sharp enough to sever the newly-formed dunnage into individual pieces. Thus, the ability to quickly and safely replace the cutting blade of the dunnage conversion machine is a desirable characteristic.

Also, the final shape of the dunnage is determined by the rollers that crumple and otherwise deform the paper stock. It is desirable that the rollers deform the paper stock to greatly increase the overall volume occupied by the converted paper stock, i.e., the dunnage, so that the dunnage can fulfill its intended purposes of volume-filling and cushioning.

SUMMARY

In one aspect of the disclosed technology, a dunnage conversion machine includes a drive mechanism configured to deform a stock material into dunnage, and a cutting mechanism. The cutting mechanism includes an anvil having a curvilinear surface, and a cutting portion. The anvil and the cutting portion are configured to cut the dunnage.

In another aspect of the disclosed technology, the drive mechanism includes one or more rollers.

In another aspect of the disclosed technology, the cutting portion incudes a blade.

In another aspect of the disclosed technology, the curvilinear surface of the anvil is a convex surface.

In another aspect of the disclosed technology, at least one of the anvil and the cutting portion is configured to move in relation to the other of the anvil and the cutting portion to cut the dunnage.

In another aspect of the disclosed technology, the anvil is stationary and the cutting portion is configured to move in relation to the anvil to cut the dunnage.

In another aspect of the disclosed technology, the anvil is configured so that the dunnage material is pushed around the convex surface as the cutting portion or the anvil moves to cut the dunnage.

In another aspect of the disclosed technology, the anvil has an opening defined therein and configured to permit the dunnage to pass through anvil, and the opening is defined at least in part by the convex surface.

In another aspect of the disclosed technology, the anvil further includes a first and a second lateral surface. The opening is further defined by the first and second lateral surfaces, and the anvil is further configured so that the dunnage material is pushed towards the first and second lateral surfaces as the cutting portion of the anvil moves to cut the dunnage.

In another aspect of the disclosed technology, the curvilinear surface of the anvil includes a sharp edge configured to cut the dunnage.

In another aspect of the disclosed technology, the blade includes a tip configured to cut the dunnage.

In another aspect of the disclosed technology, the blade includes a beveled leading edge.

In another aspect of the disclosed technology, the blade includes a leading edge having a convex shape.

In another aspect of the disclosed technology, the leading edge is configured push the dunnage toward a side of the cutting portion as the blade cuts the dunnage.

In another aspect of the disclosed technology, the leading edge is substantially straight.

In another aspect of the disclosed technology, the anvil incudes a tip. The tip of the anvil and the tip of the cutting portion are configured to approach each other when the anvil and/or the cutting mechanism moves in relation to the other of the anvil and the cutting mechanism.

In another aspect of the disclosed technology, a dunnage conversion machine includes a drive mechanism configured to deform a stock material into dunnage, and a cutting mechanism having a shuttle and a cutting portion. The cutting portion is configured to mate with the shuttle so that that movement of the shuttle moves the cutting portion to cut the dunnage.

In another aspect of the disclosed technology, the drive mechanism includes one or more rollers.

In another aspect of the disclosed technology, the cutting portion includes a blade.

In another aspect of the disclosed technology, the shuttle includes a protrusion. The protrusion has a base, and wings extending laterally from the base, and the cutting portion is configured to receive the protrusion.

In another aspect of the disclosed technology, the dunnage is fed to the cutting mechanism in a first direction, and the shuttle and the cutting portion are configured to move in relation to the dunnage in a second direction substantially perpendicular to the first direction.

In another aspect of the disclosed technology, one of the shuttle and the cutting portion includes a protrusion, and the other of the shuttle and the cutting portion is configured to receive the protrusion.

In another aspect of the disclosed technology, the protrusion is configured to engage the other of the shuttle and the cutting portion, and the engagement of the protrusion and the other of the shuttle and the cutting portion couples the shuttle to the cutting portion for movement in the second direction.

In another aspect of the disclosed technology, the other of the shuttle and the cutting portion has one or more openings formed therein, and the one or more openings are configured to receive the protrusion.

In another aspect of the disclosed technology, a shape and dimensions of the one or more openings are substantially the same as a respective shape and dimensions of the protrusion.

In another aspect of the disclosed technology, the protrusion is substantially T-shaped.

In another aspect of the disclosed technology, the protrusion includes a base, and wings extending laterally from the base.

In another aspect of the disclosed technology, movement of the cutting portion in relation to the shuttle in a first direction is limited by the base, and movement of the cutting portion in relation to the shuttle in a second direction perpendicular to the first direction is limited by the wings.

In another aspect of the disclosed technology, the shuttle is configured to move the cutting portion along a cutting plane to cut the dunnage, and the protrusion is positioned in a plane substantially parallel to the cutting plane.

In another aspect of the disclosed technology, the shuttle is configured to move the cutting portion along a cutting plane to cut the dunnage, and the protrusion is positioned in a plane substantially parallel to the cutting plane.

In another aspect of the disclosed technology, the protrusion is unitarily formed with a remainder of the shuttle.

In another aspect of the disclosed technology, dunnage conversion machine includes a drive mechanism configured to deform a stock material into dunnage, and a cutting mechanism. The cutting mechanism includes a cutting portion, a shuttle configured to move the cutting portion along a plane to cut the dunnage, and a motor assembly including a rotatable crank configured to be coupled to the shuttle so that that rotation of the crank moves the shuttle along the plane. The shuttle is configured to be disengaged from the crank by moving the shuttle along the plane when the crank is in a first angular position in relation to the shuttle.

In another aspect of the disclosed technology, the drive mechanism includes one or more rollers.

In another aspect of the disclosed technology, the cutting portion includes a blade.

In another aspect of the disclosed technology, the shuttle is configured to move the cutting portion along the plane to cut the dunnage as the crank moves from the first to a second angular position of the crank.

In another aspect of the disclosed technology, the second angular position is offset from the first angular position by about 180 degrees.

In another aspect of the disclosed technology, the shuttle is configured to move the cutting portion along the plane in a first direction, the shuttle defines a track having a longitudinal axis oriented in a second direction substantially perpendicular to the first direction, and the crank is configured to engage the shuttle by way of the track.

In another aspect of the disclosed technology, the shuttle further defines an opening that adjoins the track, the crank includes a projection, the track is configured to receive the projection, and the shuttle is further configured to disengage from the crank when the projection aligns with the opening.

In another aspect of the disclosed technology, the shuttle is further configured to disengage from the crank only when the projection aligns with the opening.

In another aspect of the disclosed technology, the shuttle is further configured so that the projection aligns with the opening only when the crank is in the first or the second angular position.

In another aspect of the disclosed technology, the shuttle is configured to move the cutting portion along the plane in a first direction, and the shuttle is further configured to be disengaged from the crank by moving the shuttle along the plane in a direction opposite the first direction.

In another aspect of the disclosed technology, a dunnage conversion machine includes a drive mechanism configured to deform a stock material into dunnage, and a cutting mechanism. The cutting mechanism includes an anvil, a cutting portion, and a magnet mounted on one of the cutting portion and the anvil and configured to magnetically and slidably couple the cutting portion and the anvil.

In another aspect of the disclosed technology, the drive mechanism includes one or more rollers.

In another aspect of the disclosed technology, the cutting portion includes a blade.

In another aspect of the disclosed technology, the cutting portion or the anvil defines a recess configured to receive the magnet.

In another aspect of the disclosed technology, the cutting portion further includes a first edge, and the magnet is mounted on the cutting portion adjacent the first edge.

In another aspect of the disclosed technology, the magnet is a first magnet, the cutting portion further includes a second magnet and a second edge, and the second magnet is mounted adjacent the second edge.

In another aspect of the disclosed technology, the first edge defines a first side of the cutting portion, and the second edge defines a second side of the cutting portion.

In another aspect of the disclosed technology, a system for producing dunnage includes a dunnage conversion machine configured to deform a stock material into dunnage, and an intake including an inlet chute configured to feed the line of high-density material to the dunnage conversion machine. The inlet chute incudes a first wall having a first surface, and a second wall having a second surface. The first and second surfaces define an interior channel.

The interior channel is configured to form part of a material path the stock material along which the high-density material is fed to the dunnage conversion machine, the second surface is configured to form a protrusion that extends toward the first surface, and the protrusion and an opposing portion of the first surface define a restriction within the interior channel.

In another aspect of the disclosed technology, the dunnage conversion machine includes one or more rollers.

In another aspect of the disclosed technology, the restriction is configured to permit the high-density material to move past the restriction, and the restriction is further configured to prevent objects having dimensions above a predetermined value from moving past the restriction.

In another aspect of the disclosed technology, the restriction is configured to permit the high-density material to move past the restriction, and the restriction is further configured to prevent fingers and/or a hand of a user from moving past the restriction.

In another aspect of the disclosed technology, the first surface is substantially planar.

In another aspect of the disclosed technology, the first surface is flat.

In another aspect of the disclosed technology, the first surface has a large radius.

In another aspect of the disclosed technology, the first surface has a radius of curvature greater than about ten feet.

In another aspect of the disclosed technology, the first surface is substantially horizontal.

In another aspect of the disclosed technology, the first surface is substantially planar along an entire length of the first wall.

In another aspect of the disclosed technology, the first wall is a bottom wall of the inlet chute and the second wall is a top wall of the inlet chute.

In another aspect of the disclosed technology, the inlet chute includes an inlet end and an outlet end, and the restriction is positioned closer to the inlet end than the outlet end.

In another aspect of the disclosed technology, the inlet chute has a first width at the second location, the inlet chute has a second width at the outlet end, and the first width is greater than the second width.

In another aspect of the disclosed technology, the second wall is angled at a first angle in relation to the material path upstream of the second location, the second wall is angled at a second angle in relation to the material path downstream of the second location, and the first angle is steeper than the second angle.

In another aspect of the disclosed technology, a system for producing dunnage includes a dunnage conversion machine configured to deform a stock material into dunnage, and an intake. The intake includes an inlet chute configured to feed the stock material to the dunnage conversion machine, and a guide configured to guide the stock material to the inlet chute. The guide defines an aperture configured to receive the stock material.

In another aspect of the disclosed technology, the dunnage conversion machine includes one or more rollers.

In another aspect of the disclosed technology, the guide includes a first guide surface configured to guide the stock material in a first configuration to the inlet chute and over the aperture.

In another aspect of the disclosed technology, the first guide surface is a leading edge of the guide.

In another aspect of the disclosed technology, the first guide surface has a substantially arcuate shape.

In another aspect of the disclosed technology, the first guide surface defines a single arc along a width of the first guide surface.

In another aspect of the disclosed technology, the first guide surface defines a plurality of arcs along a width of the first guide surface.

In another aspect of the disclosed technology, a width of the first guide surface is about equal to a width of the stock material when the stock material is in a substantially planar configuration.

In another aspect of the disclosed technology, the guide includes a textured and/or discontinuous surface on a portion of the guide located adjacent to, and below the first guide surface.

In another aspect of the disclosed technology, the guide includes a second guide surface configured to guide the stock material the inlet chute when the stock material is in a twisted configuration.

In another aspect of the disclosed technology, the second guide surface is positioned between the inlet chute and the first guide surface.

In another aspect of the disclosed technology, the aperture is defined, in part, by the second guide surface.

In another aspect of the disclosed technology, the aperture is configured to receive the stock material when the stock material is in a twisted configuration.

In another aspect of the disclosed technology, the second guide surface is substantially linear.

In another aspect of the disclosed technology, the aperture extends through an upper surface of the guide; and the second guide surface is substantially perpendicular to the first guide surface.

In another aspect of the disclosed technology, the second surface is configured to impart a bend of about 90 degrees to the stock material.

In another aspect of the disclosed technology, the inlet chute defines an inlet opening for receiving the high-density material, and a width of the inlet opening is greater than a width of the aperture.

In another aspect of the disclosed technology, dunnage conversion machine includes a drive mechanism having a first roller with an outer surface having a first shape, and a second roller having an outer surface with a second shape different than the first shape. The first and second rollers are configured to convert a high-density stock material into low density-dunnage.

In another aspect of the disclosed technology, the outer surface of the first roller is substantially smooth.

In another aspect of the disclosed technology, the outer surface of the second roller defines projections configured to compress the stock material against the outer surface of the first roller.

In another aspect of the disclosed technology, the projections include a substantially planar face configured to compress the stock material against the outer surface of the first roller.

In another aspect of the disclosed technology, the projections includes a tip configured to compress the stock material against the outer surface of the first roller.

In another aspect of the disclosed technology, the outer surface of the second roller includes a plurality of grooves, and the second roller includes a plurality of ridges disposed in the grooves.

In another aspect of the disclosed technology, the outer surface of the first roller includes a substantially non-tacky material.

In another aspect of the disclosed technology, the non-tacky material includes silicone.

In another aspect of the disclosed technology, the first roller is idle.

In another aspect of the disclosed technology, the drive mechanism further includes a motor configured to, during operation, rotate the second roller.

In another aspect of the disclosed technology, each of the ridges includes an O-ring.

In another aspect of the disclosed technology, a first ridge of the plurality of ridges extends from the second roller by a first distance, and a second of the plurality of ridges extends from the second roller by a second distance different than the first distance.

In another aspect of the disclosed technology, the first ridge is configured to press the stock material against the first roller with a first pressure, and the second ridge is configured to press the stock material against the first roller with a second pressure different from the first pressure.

In another aspect of the disclosed technology, the second pressure is approximately zero.

In another aspect of the disclosed technology, the plurality of ridges includes a third ridge extending from the second roller at a third distance different than the second distance, and the second ridge is positioned between the first and third ridges.

In another aspect of the disclosed technology, the projections extend in planes that are non-perpendicular to a longitudinal axis of the second roller.

In another aspect of the disclosed technology, a system for producing dunnage includes a dunnage conversion machine configured to deform a stock material into dunnage, and an intake including an inlet chute configured to guide the stock material to the dunnage conversion machine. The inlet chute incudes includes a first lower interior surface, a ramped surface adjoining and being located upstream of the first interior lower surface; a second lower interior surface adjoining and being located upstream of the ramp surface; a first upper interior surface; and a second upper interior surface adjoining and being located upstream of the first interior upper surface.

The first lower interior surface, the ramped surface, the second lower interior surface, the first upper interior surface, and the second upper interior surface define a channel extending between an inlet end and an outlet end of the chute. A portion of the channel defined between the first lower interior surface, the ramped surface, and the first upper interior surface is configured to gather the stock material. A portion of the channel defined between the second upper interior surface and the second lower interior surface is configured to direct the gathered stock material into a location at the outlet end of the chute.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
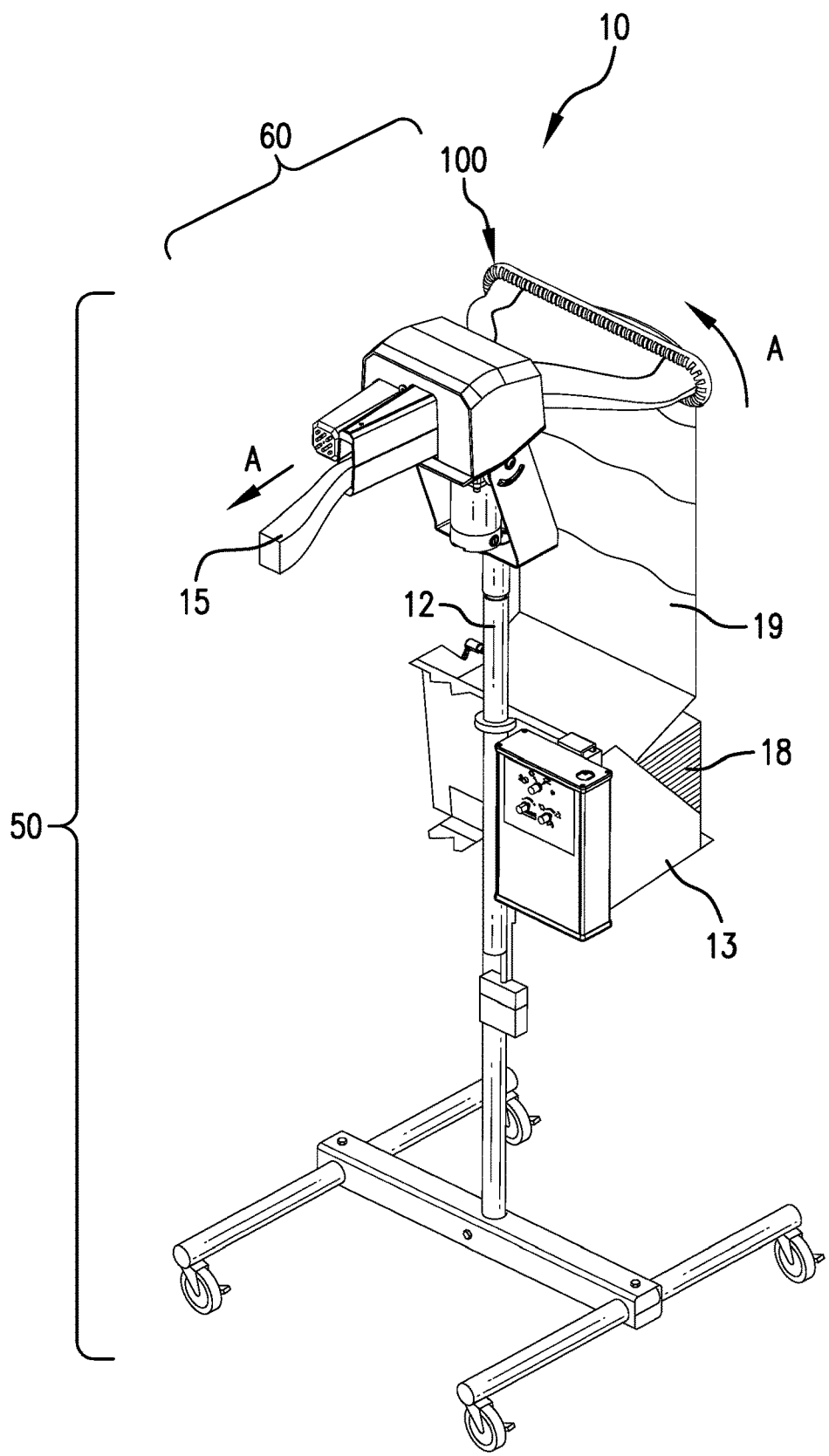
FIG. 1 is a top-rear perspective view of a system for producing dunnage.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

Various examples of the disclosed technology are provided throughout this disclosure. The use of these examples is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially parallel" indicates that the parallel relationship is not a strict relationship and does not exclude functionally similar variations therefrom. As used herein, the term "substantially orthogonal" indicates that the orthogonal relationship is not a strict relationship and does not exclude functionally similar variations therefrom.

Systems for converting a high-density stock material into low-density dunnage are disclosed. The stock material is processed by longitudinal crumple machines that form creases longitudinally in the stock material to form dunnage, or by cross crimple machines that form creases transversely across the stock material. The supply unit of stock material can be stored in a roll (whether drawn from inside or outside the roll), a wind, a fan-folded source, or other suitable form. The stock material can be continuous or perforated. The conversion apparatus is fed the stock material from the supply unit in a first direction, which can be an anti-run out direction.

The stock material can be any suitable type of protective packaging material including, for example, flat or rolled paper stock, other dunnage and void fill materials, inflatable packaging pillows, etc. Some embodiments can use supplies of other paper or fiber-based materials in sheet form. Other embodiments can use supplies of wound fiber material such as ropes or thread. Other embodiments can use thermoplastic materials such as a web of plastic material usable to form pillow packaging material. Examples of paper used include a fan-folded supply unit having stock material with 30-inch transverse widths and/or 15-inch transverse widths. Preferably these sheets are fan folded as single layers. In other embodiments, the multiple layers of sheets can be fan folded together such that dunnage is made of superimposed sheets that are crumpled together in the conversion process.

Figure 2:
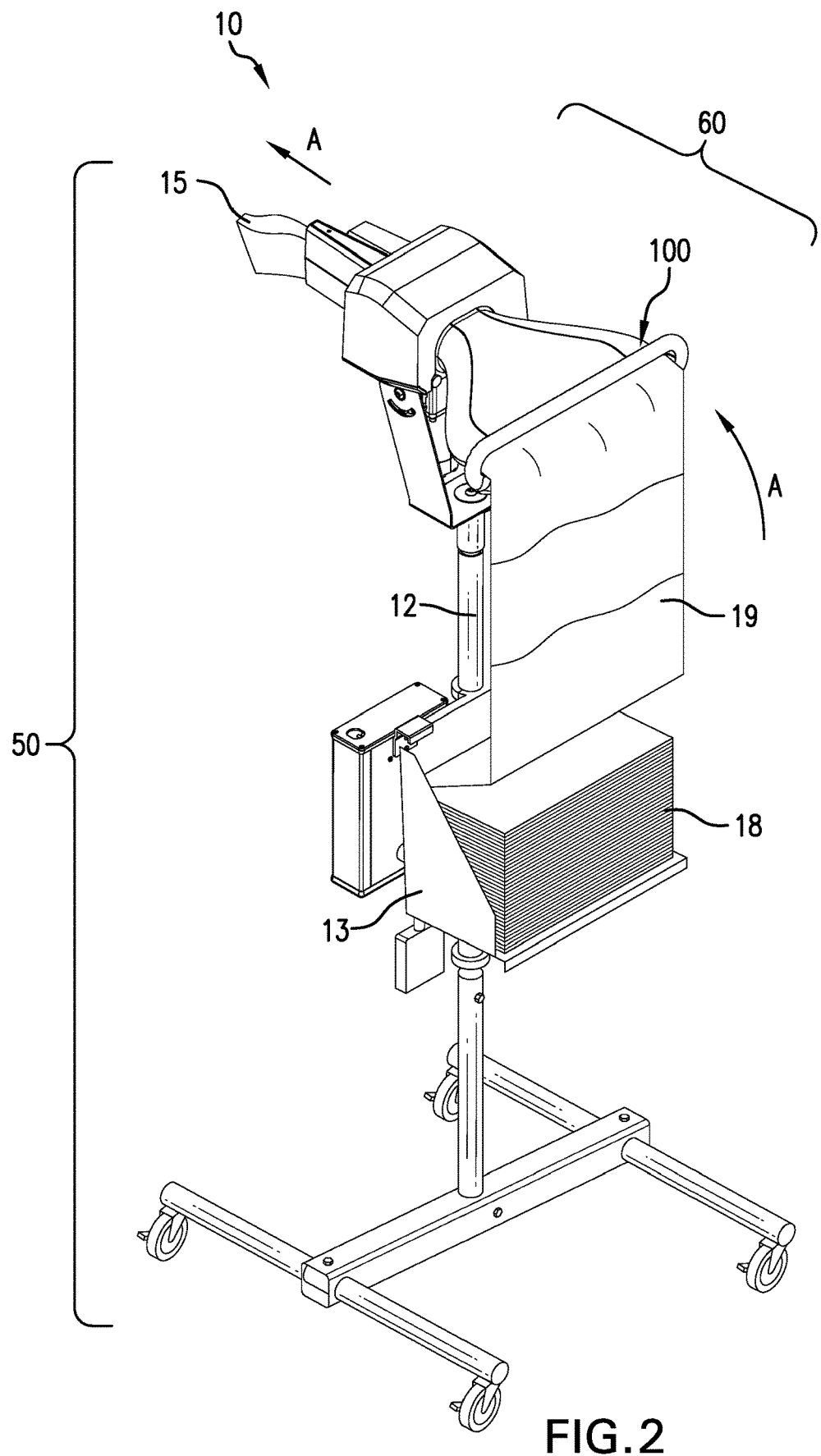
FIG. 2 is a top-front perspective view of the system shown in FIG. 1.
Figure 29:
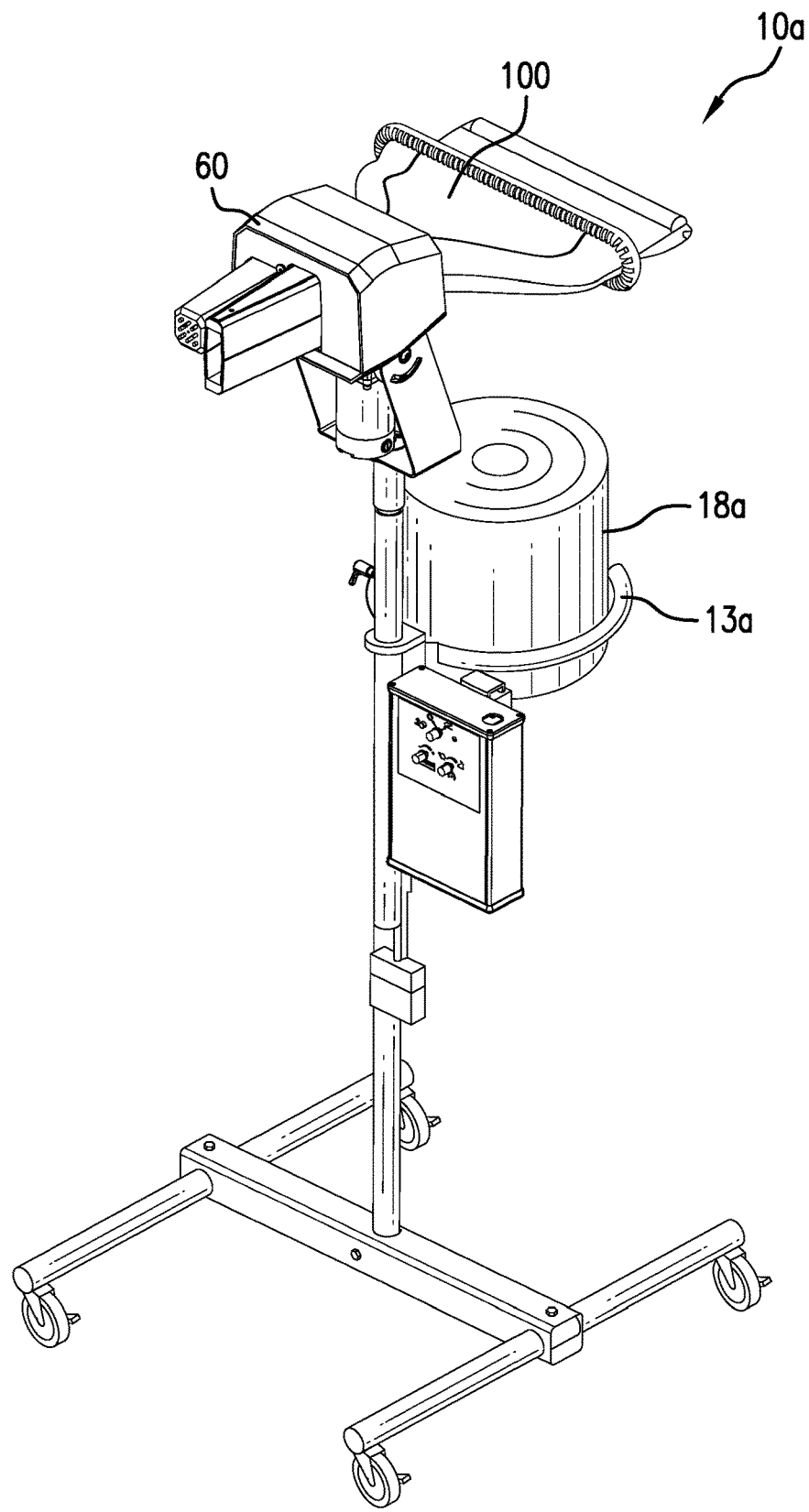
FIG. 29 is a top-rear perspective view of an alternative embodiment of the system shown in FIGS. 1 and 2.
Figure 30:
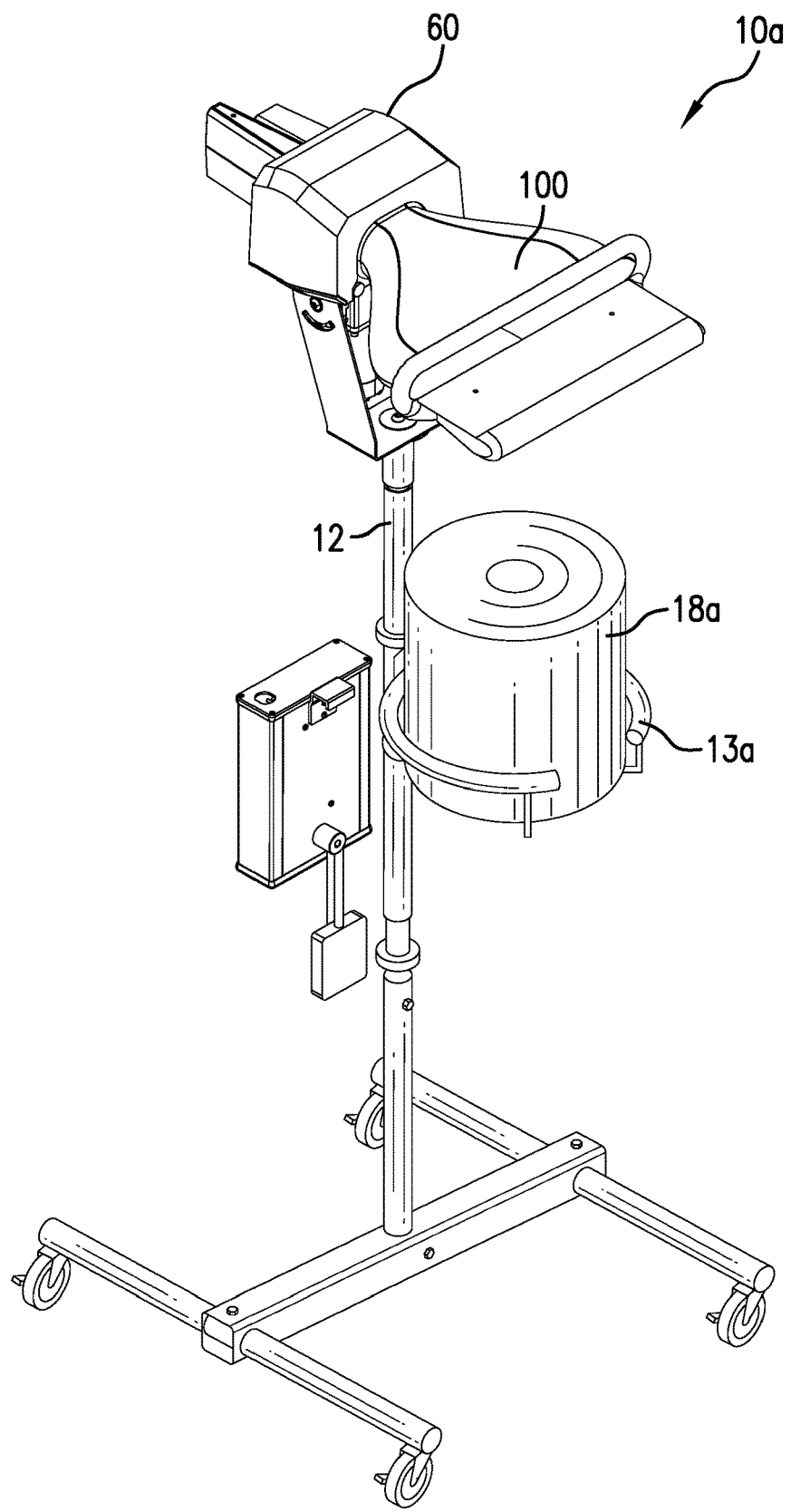
FIG. 30 is a top-front perspective view of the system shown in FIG. 29.

Any suitable stock material may be used. For example, the stock material can have a basis weight of about 20 lbs. to about 100 lbs. The stock material may comprises paper stock stored in a high-density configuration having a first longitudinal end and a second longitudinal end, that is later converted into a low-density configuration by the conversion system. The stock material can be a ribbon of sheet material that is stored in a fan-fold structure as shown in FIGS. 1 and 2; or in coreless rolls as shown in FIGS. 29 and 30. The stock material can be formed or stored as single-ply or multiple plies of material. Where multi-ply material is used, a layer can include multiple plies. Other types of material can be used, such as pulp-based virgin and recycled papers, newsprint, cellulose and starch compositions, and poly or synthetic material, of suitable thickness, weight, and dimensions.

In some embodiments, the supply units of stock material may have fan-fold configurations. For example, a foldable material, such as paper, may be folded repeatedly to form a stack or a three-dimensional body. The term "three-dimensional body," in contrast to the "two-dimensional" material, has three dimensions all of which are non-negligible. A continuous sheet, e.g., a sheet of paper, plastic, or foil, can be folded at multiple fold lines that extend transversely to a longitudinal direction of the continuous sheet, or transversely to the feed direction of the sheet. For example, folding a continuous sheet that has a substantially uniform width along transverse fold lines can form or define sheet sections that have approximately the same width. The continuous sheet can be folded sequentially, in opposite or alternating directions, to produce an accordion-shaped continuous sheet. For example, the folds may form or define sections along the continuous sheet, and the sections may be substantially rectangular.

For example, sequentially folding the continuous sheet may produce an accordion-shaped continuous sheet with sheet sections that have approximately the same size and/or shape as one another. Multiple adjacent sections that are defined by the fold lines can be generally rectangular, and can have the same first dimension, e.g., a dimension corresponding to the width of the continuous sheet, and the same second dimension that is generally along the longitudinal direction of the continuous sheet. For example, when the adjacent sections are contacting one another, the continuous sheet may be configured as a three-dimensional body or a stack, in an accordion shape that is formed by the folds and be compressed, so that the continuous sheet forms a three-dimensional body or stack.

The fold lines of the stock material can have any suitable orientation relative to one another, as well as relative to the longitudinal and transverse directions of the continuous sheet. Also, the stock material unit can have transverse folds that are parallel one to another. For example, the sections that are formed by the fold lines can be compressed to form a three-dimensional body that is a rectangular prismoid. Also, the stock material can have one or more folds that are non-parallel relative to the transverse folds.

The stock material can be provided as any suitable number of discrete stock material units. In some embodiments, two or more stock material units can be connected together to provide a continuous feed of material into the dunnage conversion machine. The material can be fed from the connected stock material units sequentially or concurrently, i.e., in series or in parallel. The stock material units can have various suitable sizes and configurations, and may include one or more stacks or rolls of suitable sheet materials. The term "sheet material" refers to a material that is generally sheet-like and two-dimensional, i.e., two dimensions of the material are substantially greater than the third dimension so that the third dimension is negligible or de minimis in comparison to the other two dimensions. Also, the sheet material can be generally flexible and foldable, such as the illustrative materials described herein.

The stock material units can include an attachment mechanism that connects multiple units of stock material, for example, to produce a continuous material feed from multiple discrete stock material units. The respective end and beginning of consecutive rolls can be joined by adhesive or other suitable means, to facilitate daisy-chaining the rolls together to form a continuous stream of sheet material that can be fed into the dunnage conversion machine.

Folding a continuous sheet along the transverse fold lines can form or define generally rectangular sheet sections. The rectangular sheet sections can stack together by, for example, folding the continuous sheet in alternating directions, to form the three-dimensional body that has longitudinal, transverse, and vertical dimensions. The stock material from the stock material units can be fed through an intake, such as the intake 100 as shown in FIGS. 1-10. In some applications, the transverse direction of the continuous sheet of stock material can be greater than one or more dimensions of the intake. For example, the transverse dimension of the continuous sheet can be greater than the diameter of a generally round intake. Reducing the width of the continuous sheet in this manner at the start of the conversion process can facilitate passage thereof into the intake. The decreased width of the leading portion of the continuous sheet may facilitate smoother entry and/or transition of a daisy-chained continuous sheet and/or may reduce or eliminate catching or tearing of the continuous sheet. Moreover, reducing the width of the continuous sheet at the start thereof can facilitate connecting together or daisy-chaining two or more stock material units. For example, connecting or daisy-chaining material with a tapered section may be accomplished using smaller connectors or splice elements than would be required otherwise. Also, tapered sections may be easier to manually align and/or connect together in comparison to full-width sheet sections FIGS. 1 and 2 depict an embodiment of a system for producing dunnage 10. The system 10 is configured to process stock material 19 into dunnage 15. The system 10 includes a supply unit 18 of the stock material 19, and a dunnage apparatus 50.

The dunnage apparatus 50 includes a dunnage conversion machine 60; a support 12 configured to support the dunnage conversion machine 60; and a supply station 13 configured to hold the supply unit 18 of stock material 19.

The specific configuration of the support 12 depicted in the figures is disclosed for illustrative purposes only. The support 12 can have other configurations suitable for supporting the dunnage conversion machine 60.

Likewise, the shelf or basket-type configuration of the supply station 13 depicted in FIGS. 1 and 2, which accommodates a supply unit 18 in the form of a stack of folded stock material 19, is disclosed for illustrative purposes only. The supply station 13 can have other configurations suitable for supporting the supply unit(s) 18, for example, in single bundles; in multiple daisy chained bundles; in a flat configuration; in a rolled configuration; and/or in a curved configuration.

For example, FIGS. 29 and 30 depict an alternative embodiment of the system 10 in the form of a system for producing dunnage 10a. The system 10a includes a supply station 13a configured to accommodate a supply unit 18a of stock material 19 in the form of a roll. In other alternative embodiments, the supply station 13 can be a cart (not shown) that is movable relative to the dunnage conversion machine 60. In other embodiments, the supply station 13 can be a basket (as shown in FIGS. 1 and 2), a shelf, or other types of supporting structures mounted on the stand 12. In such embodiments, the dunnage conversion machine 60 and the supply station 13 do not move relative to one another. In other embodiments, the supply station 13 and the dunnage conversion machine 60 may be fixed relative to one another but not mounted to each other. In other alternative embodiments, the supply station 13 and the dunnage conversion machine 60 may be configured to move relative to one another while, or without being mounted together.

The supply station 13 can support one or more of the supply units 18 of stock material 19. FIGS. 1A-1C illustrate the supply station 13 supporting a plurality of supply units 18. In applications where multiple supply units 18 are accommodated by the supply station 13, the end and beginning sheets of adjacent supply units 18 be connected together before or after being placed on the supply station 13. Connecting together or daisy-chaining multiple supply units can produce a continuous supply of stock material 19.

The stock material 19 is converted to the dunnage 15 by following a material path A through the system 10, as depicted in FIGS. 1 and 2. The material path A has an inlet end where the stock material 19 is fed into the system 10, and an outlet end where the dunnage 15 exits the system 10.

Figure 3:
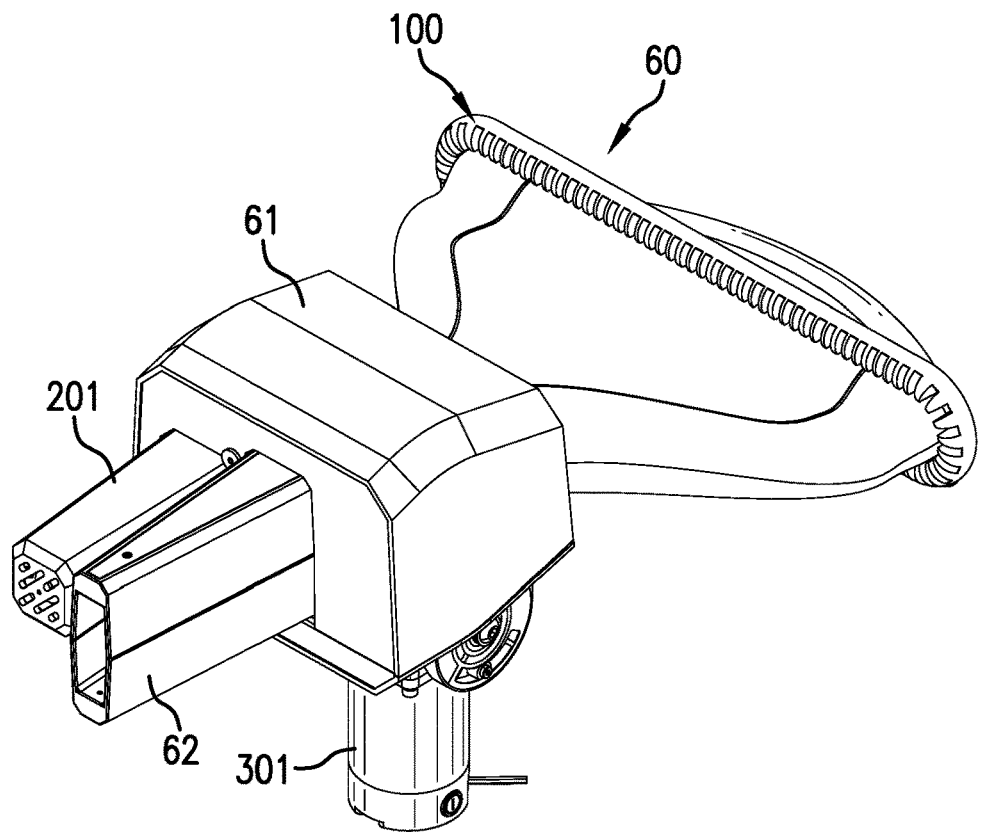
FIG. 3 is a top-rear perspective view of a dunnage conversion machine and an intake of the system shown in FIGS. 1 and 2, with the intake in a closed position of the intake.
Figure 4:
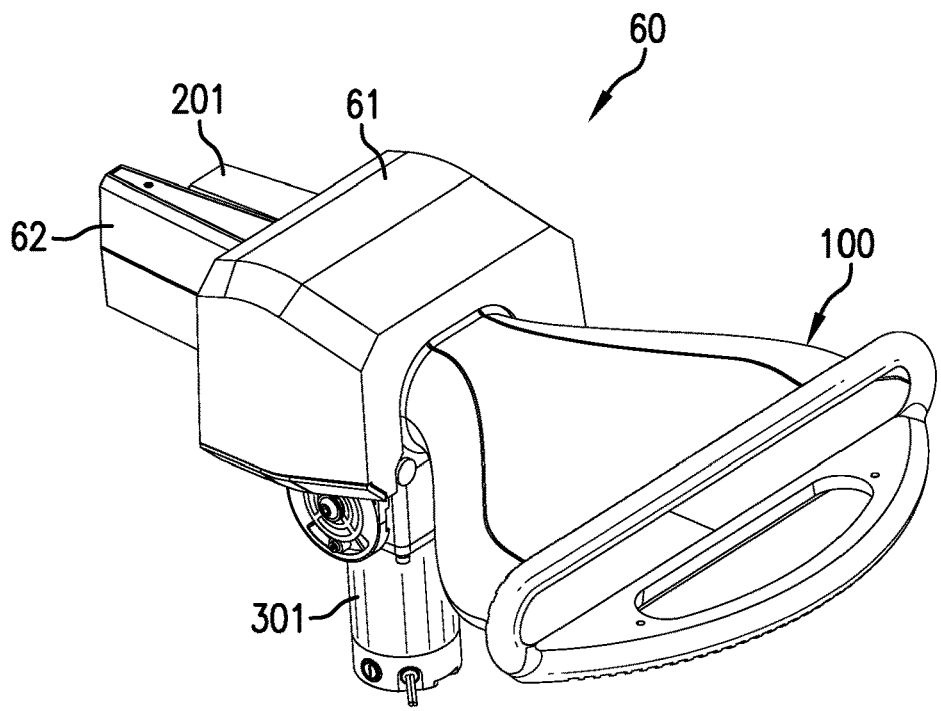
FIG. 4 is a top-front perspective view of the dunnage conversion machine and the intake shown in FIGS. 1-3, with the intake in the closed position.

FIGS. 3-8 depict the dunnage conversion machine 60 of the system 10. As can be seen in FIGS. 3 and 4, the dunnage conversion machine 60 includes an enclosure 61; the intake 100; an outlet chute 62; a cutting motor assembly 201; and a feed motor 301 extending from the enclosure 61.

Figure 5:
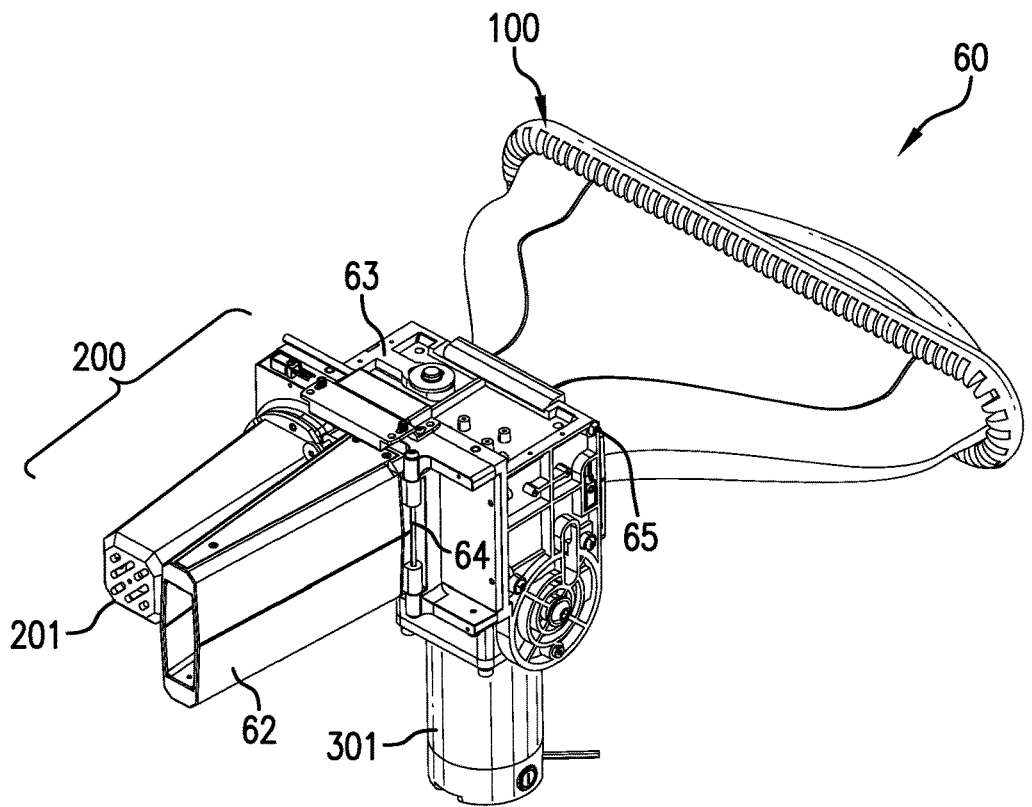
FIG. 5 is a top-rear perspective view of the dunnage conversion machine and the intake shown in FIGS. 1-4, with an enclosure of the dunnage conversion machine removed and the intake in the closed position.
Figure 6:
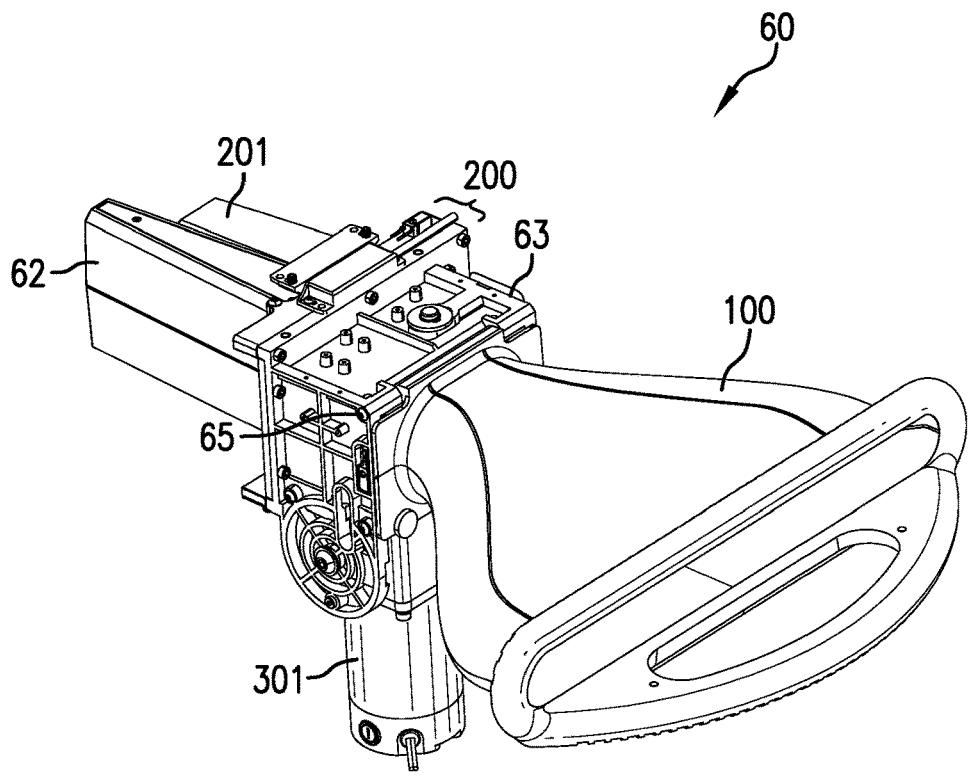
FIG. 6 is a top-front perspective view of the dunnage conversion machine and the intake shown in FIGS. 1-5, with the enclosure of the dunnage conversion machine removed the intake in the closed position.
Figure 7:
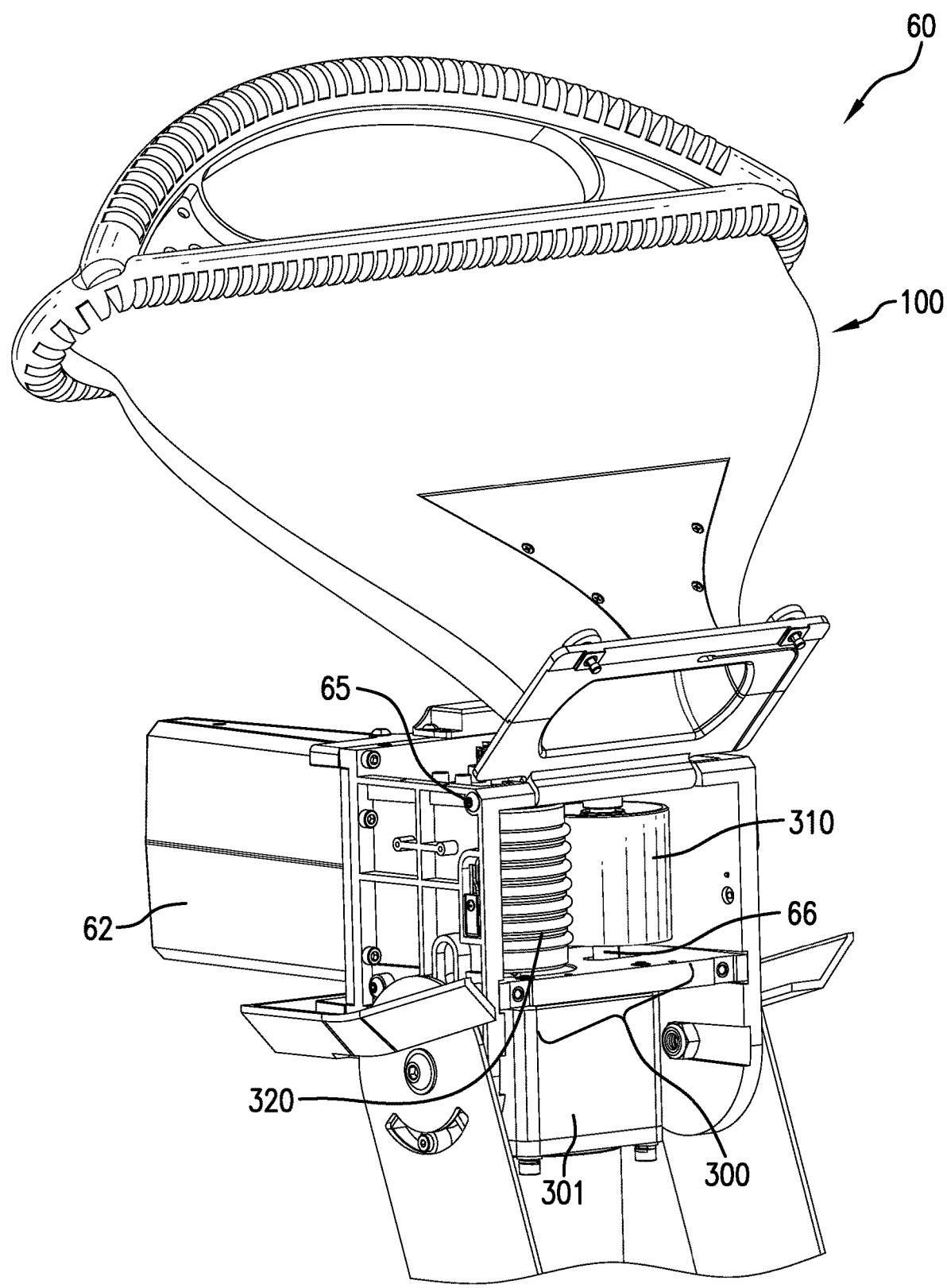
FIG. 7 is a side-front perspective view of the dunnage conversion machine and the intake shown in FIGS. 1-5, with the enclosure of the dunnage conversion machine removed the intake in an open position of the intake.

For purposes of illustration, FIGS. 5 and 6 depict the dunnage conversion machine 60 without the enclosure 61, thus exposing a frame 63 and a cutting mechanism 200 of the dunnage conversion machine 60. As can be seen in FIGS. 5 and 6, the intake 100 is rotatably coupled to the frame 63 through an inlet spindle 65. Specifically, the intake 100 defines a channel 131, visible in FIGS. 8-10, that aligns with a channel (not shown) defined by the frame 63. The channel 131 and the channel defined by the frame 63 receive the inlet spindle 65. FIG. 7 depicts the intake 100 rotated upward about the inlet spindle 65, from a closed or lowered position shown in FIGS. 1-6, to a raised or an open position shown in FIG. 7. The ability to rotate the intake 100 upward in this manner allows a user to clear material that may be jammed in, or otherwise obstructing the exit portion of the intake 100.

The dunnage conversion machine 60 also includes a drive assembly 300, visible in FIG. 7. The drive assembly 300 includes the feed motor 301, and rollers 310, 320 that are driven by the feed motor 301. The rollers 310, 320 are configured to drive the stock material 19 through the dunnage conversion machine 60, and to convert the stock material 19 into dunnage.

The dunnage conversion machine 60 is configured to reverse the direction of travel of the stock material 19 as it moves through the dunnage conversion machine 60. The ability to reverse the direction of travel of the stock material 19 allows the converted dunnage material exiting the dunnage conversion machine 60 to be pulled against certain types of cutting apparatuses with which the dunnage conversion machine 60 may be equipped, which in turn can assist the cutting mechanism in cutting the dunnage material.

Figure 8:
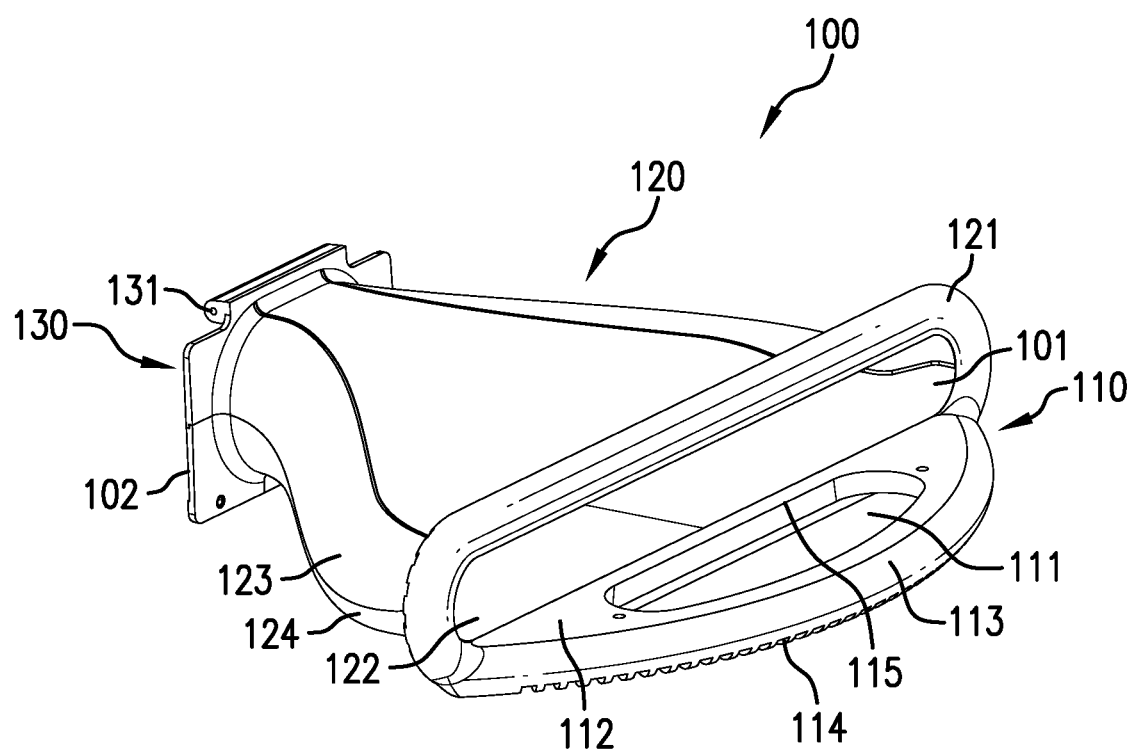
FIG. 8 is a top-front perspective view of the intake shown in FIGS. 1-7.
Figure 9:
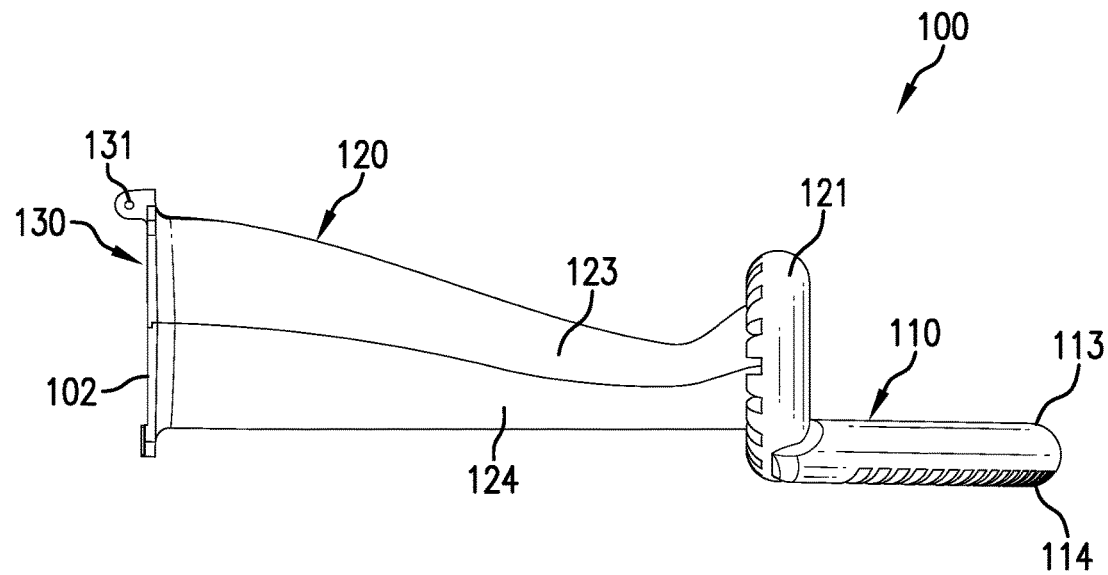
FIG. 9 is a side view of the intake shown in FIGS. 1-8.
Figure 10:
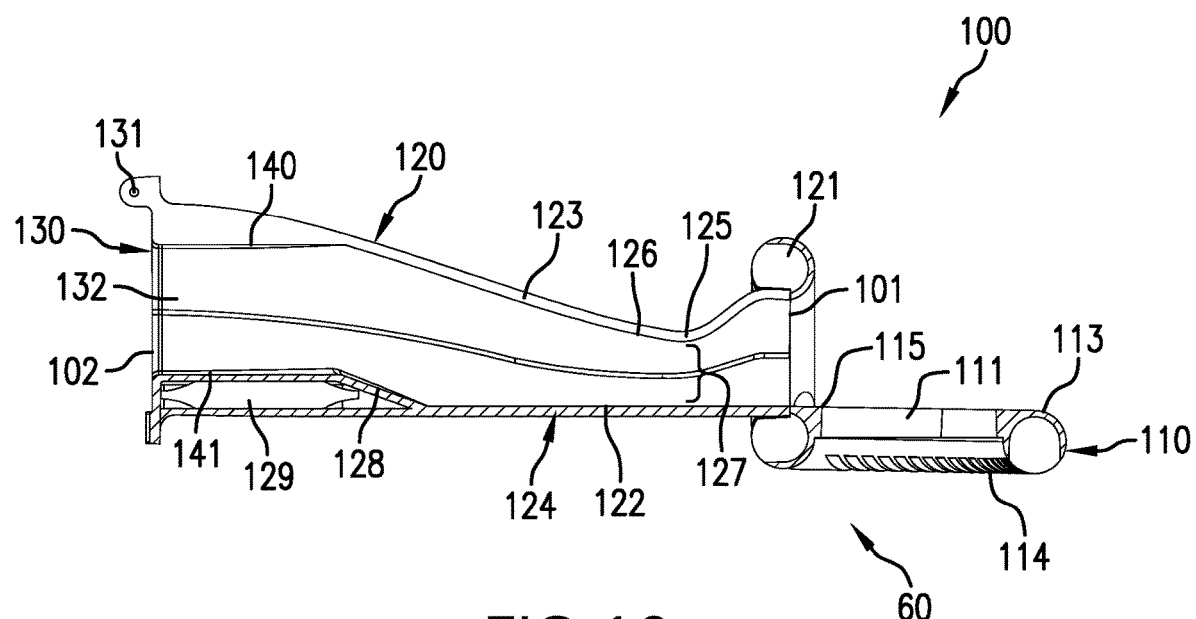
FIG. 10 is a longitudinal cross-sectional view of the intake shown in FIGS. 1-9.

Referring to FIGS. 8-10, the intake 100 includes a guide 110, an inlet chute 120, and an exit plate 130. The guide 110 adjoins a forward, or upstream end of the inlet chute 120. The guide 110 and the inlet chute 120 can be formed integrally. Alternatively, the guide 110 and the inlet chute 120 can be formed separately, and can be connected by a suitable means such as fasteners, so that that the guide 110 can be removably connected to the inlet chute 120. The removable configuration permits the guide 110 to be removed from the inlet chute 120 when, for example, is not necessary or desirable to bend the stock material 19 as the stock material 19 is being fed to the inlet chute 120. Permitting the guide 110 to be removed thus can increase the ability of the user to customize the manner in which the stock material 19 is bent as it is fed into the inlet chute 120.

The exit plate 130 adjoins a rearward, or downstream end of the inlet chute 120. The exit plate 130 and the inlet chute 120 can be formed integrally. Alternatively, the exit plate 130 and the inlet chute 120 can be formed separately, and can be connected by a suitable means such as fasteners.

The inlet chute 120 has a mouth 121 that defines an inlet end 101 for receiving the stock material 19. The exit plate 130 defines an outlet end 102 through which the stock material 19 passes as it exits the intake 100 while traveling along the material path A. The exit plate 130 is configured to secure the intake 100 to the frame 63. More specifically, the exit plate 130 defines the channel 131 that receives the spindle 65 that couples the intake 100 to the frame 63.

The guide 110 is configured to receive the stock material 19 as the stock material 19 is being fed into and through the inlet chute 120. The guide 110 extends from a lower portion of the mouth 121 of the inlet chute 120, so that an upper surface 112 of the guide 110 and a first lower surface 122 of the inlet chute 120 define a substantially planar surface for feeding the stock material 19 along the material path A. The material path A along the upper surface 112 of the guide 110 and a first lower surface 122 of the inlet chute 120, therefore, is substantially linear when viewed from the side. Also, the stock material 19 travels in a substantially horizontal direction, and undergoes no change in orientation, when moving over the upper surface 112 of the guide 110 and the first lower surface 122.

As used herein, the term "substantially planar surface" can refer to a surface that is so smooth as to be seemingly completely flat. For example, a "substantially planar surface" can be a completely flat surface. Also, a substantially planar surface" can be a surface having a large radius of curvature, e.g., ten feet or more.

Although the guide 110 is depicted as extending from the inlet chute 120 so that the upper surface 112 of the guide 110 and the first lower surface 122 of the inlet chute 120 are parallel, in other embodiments, the guide 110 can extend from the inlet chute 120 at an angle so that the upper surface 112 of the guide 110 and the first lower surface 122 of the inlet chute 120 are angled with respect to each other. In this configuration, the material path A along the upper surface 112 of the guide 110 and the first lower surface 122 of the inlet chute 120 is not linear.

The guide 110 can extend from the inlet chute 120 at an upward or downward angle. Where the guide 110 extends from the inlet chute 120 at a downward angle, the stock material being fed over the guide 100 can be further broken in by the resulting bend between the first lower surface 122 of the inlet chute 120 and the upper surface 112 of the guide 110. This bend can make the stock material 19 more pliable for conversion into dunnage.

The guide 110 also has a first guide surface 113, visible in FIGS. 8-10. The first guide surface 113 adjoins the upper surface 112 of the guide 110, and forms an upstream end of the guide 110. The first guide surface 113 has a substantially arcuate shape when viewed from above, so that the stock material 19 being fed over the first guide surface 113 is bent about multiple axes to form a complex bend. This bending can make the stock material 19 more pliable for conversion into dunnage and can be particularly helpful where the stock material 19 is being fed into the intake 100 in a substantially planar form as shown, for example, in FIGS. 1 and 2, which depict the stock material 19 being fed from a supply unit 18 in which the sheet material 18 is folded, and the adjacent folds are stacked.

The first guide surface 113 defines a single arc along its width, or side to side dimension. In alternative embodiments, the guide surface 113 can be shaped so as to define multiple arcs, so that the stock material 19 being fed over the guide surface 113 can be bent at multiple points on the stock material 19. Depending on the desired shape of the dunnage being produced, this additional bending can make conversion of the stock material 19 into certain types of dunnage easier. For example, the multiple bends in the stock material resulting from the multiple arcs of the guide surface 113 can facilitate easier crumpling or bending of the stock material as it is converted into dunnage.

In other alternative embodiments, the guide surface 113 can have a non-arcuate shape. For example, although the first guide surface 113 is depicted as being substantially non-angular as a means of avoiding tearing of the stock material, in other embodiments, the first guide surface 113 can be more angular. Such angularity can help form bends in certain types of thicker stock material 19 that otherwise would resist being bent by the non-angular first guide surface 113. In other alternative embodiments, the first guide surface 113 can be configured with a sharp point to create a more defined bend as the stock material 19 is fed over the first guide surface 113.

The first guide surface 113 can have a width, or side to side dimension, that is substantially similar to the width of the stock material 19 prior to the deformation of the stock material 19 by the dunnage conversion machine 60. This characteristic of the first guide surface 113 allows the guide 110 to maintain constant contact with the stock material 19, which in turn can result in more accurate guidance of the stock material 19 into the inlet chute 120. In alternative embodiments where accurate guidance is not necessary, the first guide surface 113 can have a width different than the width of the stock material 19.

The guide 110 has a textured or discontinuous surface 114 on a portion of the guide 110 located adjacent to, and below the first guide surface 113. As can be seen in FIGS. 8-10, the discontinuities in the surface 114 are defined by recesses or indentations that extend inward, into the guide 110, from the surface 114. This discontinuities in the surface 114 can help a user to grasp the guide 110 more securely by increasing the friction between the surface 114 and the user's hand.

Figure 31:
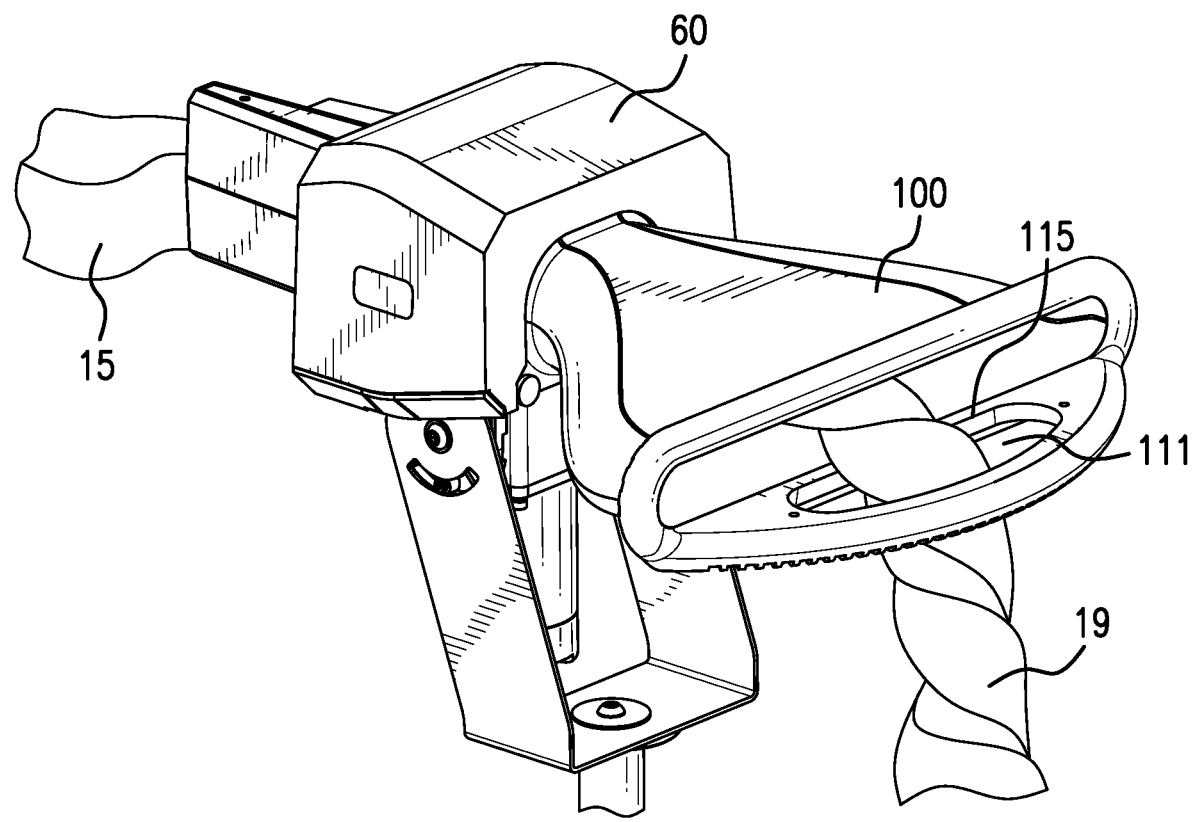
FIG. 31 is a top-front perspective view of the dunnage conversion machine and the intake shown in FIGS. 1-28, showing stock material being drawn into the intake from a roll of the stock material.

The guide 110 defines an aperture 111, shown in FIG. 8. The aperture 111 extends through the upper surface 112, and is configured so that the stock material 19 can pass therethrough as the stock material 19 is being fed to the dunnage conversion machine 60. The guide 110 further includes a second guide surface 115, also shown in FIG. 8. The stock material 19 travels over the second guide surface 115 after passing through the aperture 111. For example, in some embodiments, the second guide surface 115 can be configured to contact stock material 19 in a non-planar state. For example, FIG. 31 shows stock material 19 in a twisted configuration passing over the second guide surface 115 while being fed upward through the aperture 111 from a supply unit 18 in the form of a roll of stock material 19.

The second guide surface 115 can be shaped to make the stock material 19 more malleable as the stock material 19 is fed over the second guide surface 115. The second guide surface 115, as depicted in FIG. 8, has sharp angle, i.e., a 90-degree bend, because the stock material 19 typically passed over the second guide surface 115 in a non-planar configuration; thus, a relatively sharp surface is required to bend the stock material 19 and thereby make it more malleable for conversion into dunnage. In alternative embodiments, the second guide surface 115 can be smooth, to permit thinner stock material to travel over the second guide surface without being bent.

The second guide surface 115 is configured to accommodate stock material 19 having a width, or side to side dimension, that is less than a width of the stock material 19 that can be fed to the dunnage conversion machine 60 by way of the first guide surface 113. Thus, the second guide surface 115 requires a lesser width to maintain constant contact with the stock material 19 than the first guide surface 113. Thus, the second guide surface 115 has a width, or side to side dimension, that is less than the width of the first guide surface 113.

The second guide surface 115 is substantially linear, to reduce the potential for the non-planar stock material 19 being fed over the second guide surface 115 to catch on an edge of the second guide surface 115 and tear. The second guide surface can be non-linear in alternative embodiments. For example, the second guide surface 115 can have an arcuate profile similar to that of the first guide surface 113, to facilitate bending of the stock material 19 as it passes over the second guide surface 115. In other embodiments, the second guide surface 115 can be arcuate in a direction opposite the first guide surface, to better maintain the stock material 19 in a desired position such as the centerline of the intake 100.

The guide 110 is depicted as having one aperture 111. In alternative embodiments, the guide 110 can include multiple apertures 111. For example, in applications in which multiple streams of stock material 19 are being fed into the inlet chute 120, each aperture 111 can accommodate a respective one of the streams.

Referring to FIG. 10, the inlet chute 120 further includes a top wall 123 and a bottom wall 124. The top wall 123 incudes a first upper interior surface 126 and a second upper interior surface 140. The first upper interior surface 126 extends between the inlet end 101 of the inlet chute 120, and the second upper interior surface 140. The second upper interior surface 140 extends between the first upper interior surface 126, and the outlet end 102 of the inlet chute 120.

The bottom wall 124 has the first lower interior surface 122, a second lower interior surface 141, and a ramped surface 128. The first lower interior surface 122 extends between the inlet end 101 of the inlet chute 120, and the ramped surface 128. The ramped surface 128 extends between the first lower interior surface 122, and the second lower interior surface 141. The second lower interior surface 141 extends between ramped surface 128, and the outlet end 102 of the inlet chute 120.

Referring still to FIG. 10, the first lower interior surface 122, the second lower interior surface 141, the ramped surface 128, the first upper interior surface 126, and the second upper interior surface 140 define, in part, an interior channel 132 within the inlet chute 120. The channel 132 receives the stock material 19, and guides the stock material 19 it travels between the inlet end 101 and the outlet end 102 of the inlet chute 120.

The first lower interior surface 122 is substantially planar, and substantially smooth. This feature can reduce or eliminate the potential for the stock material 19 to jam or become snagged as the stock material 19 is fed through the inlet chute 120. The ramped surface 128 is substantially planar, and provides a smooth transition between the first lower interior surface 122 and the second lower interior surface 141. In alternative embodiments, the ramped surface 128 can have a curvilinear profile, to provide a smoother transition from the ramped surface 128 to the second lower interior surface 141.

The portion of the channel 132 defined between the second upper interior surface 140 and the second lower interior surface 141 can be shaped and positioned to guide the stock material 19 into the dunnage conversion machine 60. In particular, the second upper interior surface 140 and the second lower interior surface 141 correspond to the portion of the channel 132 within the intake chute 120 that has the narrowest width, or side to side dimension, as can be seen in FIG. 8. The relatively low width and height of the portion of the inlet chute 120 proximate its outer end 102, in comparison with the respective width and height of the portion of the inlet chute 120 proximate to the inlet end 101, allows the stock material to be fed into the inlet chute 120 without the use of a separate guide.

Thus, the portion of the channel 132 defined between the first lower interior surface 122, the ramped surface 128, and the first upper interior surface 126 is configured to gather the stock material 19 being fed into the intake chute 120; while the portion of the channel 132 defined between the second upper interior surface 140 and the second lower interior surface 141 is configured to focus the gathered stock material 19 into a relatively precise location at the outlet end 102, without the need for a guide.

Referring to FIG. 10, the bottom wall 124 can include a radio frequency identification (RFID) device 129 located beneath the surfaces 128, 141 and adjacent the outlet end 102. The RFID device 129 so configured to provide an indication to a controller (not shown) of the dunnage conversion machine 60 of when the intake 100 is, and is not in its closed position. The controller is configured to permit activation of the dunnage conversion machine 60 only when the intake 100 is in the closed position, i.e., the controller is configured to prevent activation of the dunnage conversion machine 60 when the intake 100 is in its open position, to help enhance the safety of the users and others in proximity to the dunnage conversion machine 60.

In alternative embodiments, the first lower interior surface 122, the second lower interior surface 141, and the ramped surface 128 of the bottom wall 124 can be formed as a single, substantially planar surface, to help reduce the potential for the stock material 19 to jam or otherwise become snagged while traveling through the inlet chute 120.

Referring to FIG. 10, a portion of the first upper interior surface 126 of the top wall 123 forms a protrusion 125 that extends downward, toward the bottom wall 124. The protrusion 125, together with the opposing portion of the first lower interior surface 122 of the bottom wall 124 opposite the protrusion 125, define a restriction 127. The restriction 127 allows the stock material 19 to be fed through the inlet chute 120, while preventing foreign objects from entering all the way through the inlet chute 120. In particular, the restriction 127 is sized to allow the stock material 19 to pass through the inlet chute 120, while restricting thicker objects from moving past the restriction 127, along the material path A. For example, when a user is using his or her hands to feed the stock material 19 into and through the inlet chute 120, the relatively narrow restriction 127 will prevent the user's fingers from moving past the restriction 127 and further into the inlet chute 120. The restriction 127 thus acts as a safety feature that can reduce or eliminate the potential for the user's fingers and hands to be drawn inadvertently into the dunnage conversion machine 60. Also, the restriction 127 can prevent other objects from reaching the dunnage conversion machine 60 by way of the inlet chute 120, reducing the potential for damage to the dunnage conversion machine 60 caused by the ingestion objects other than the stock material 19.

The protrusion 125 can be formed as part of the bottom wall 124, and can extend toward the top wall 123 in alternative embodiments. For example, this configuration can be used in embodiments where the stock material 19 is fed to the intake 100 from above the intake 100, and travels along the top wall 123 of the inlet chute 120. In these types of embodiments, the interior surface of the top wall 123 can be substantially planar, while the bottom wall 124 defines the protrusion 125 that extends into the channel 132 to define the restriction 127.

As can be seen in FIG. 10, the protrusion 125 located closer to the inlet end 101 of the inlet chute 120 than the outlet end 102. In alternative embodiments, the protrusion 125 can be positioned closer to the outlet end 102 than the inlet end 101. For example, in applications where the stock material 19 requires a greater degree of guidance as it is inserted into the inlet chute 120, the protrusion 125 can be located closer to the outlet end 102. This feature permits the user to guide the stock material 19 further down the channel 132, while still providing a restriction the prevents the user from inserting is or her hand all the way through the inlet chute 120. Also, in this configuration, the portion of the first upper interior surface 126 that forms the upstream side of the protrusion 125 is angled less sharply in relation to the horizontal direction than the portion of the first upper interior surface 126 that forms the downstream side of the protrusion 125, in contrast to the configuration of the protrusion 125 shown in FIG. 10.

Referring still to FIG. 10, the protrusion 125 is substantially curvilinear. In alternative embodiments, the protrusion 125 can have a triangular cross-section, so that the lowest portion of the protrusion 125 forms a tip. It is believed that the tip can be particularly effective at preventing foreign objects from passing through the inlet chute 120.

In the embodiment shown in FIG. 10, the portion of the first upper interior surface 126 that forms the upstream side of the protrusion 125 is angled more sharply in relation to the horizontal direction than the portion of the first upper interior surface 126 that forms the downstream side of the protrusion 125. In alternative embodiments, the relative orientations of the upstream and downstream sides of the protrusion 125 can be equal, or reversed from those shown in FIG. 10. Also, the height, or vertical dimension of the protrusion 125 can be different from that shown in FIG. 10.

Figure 11:
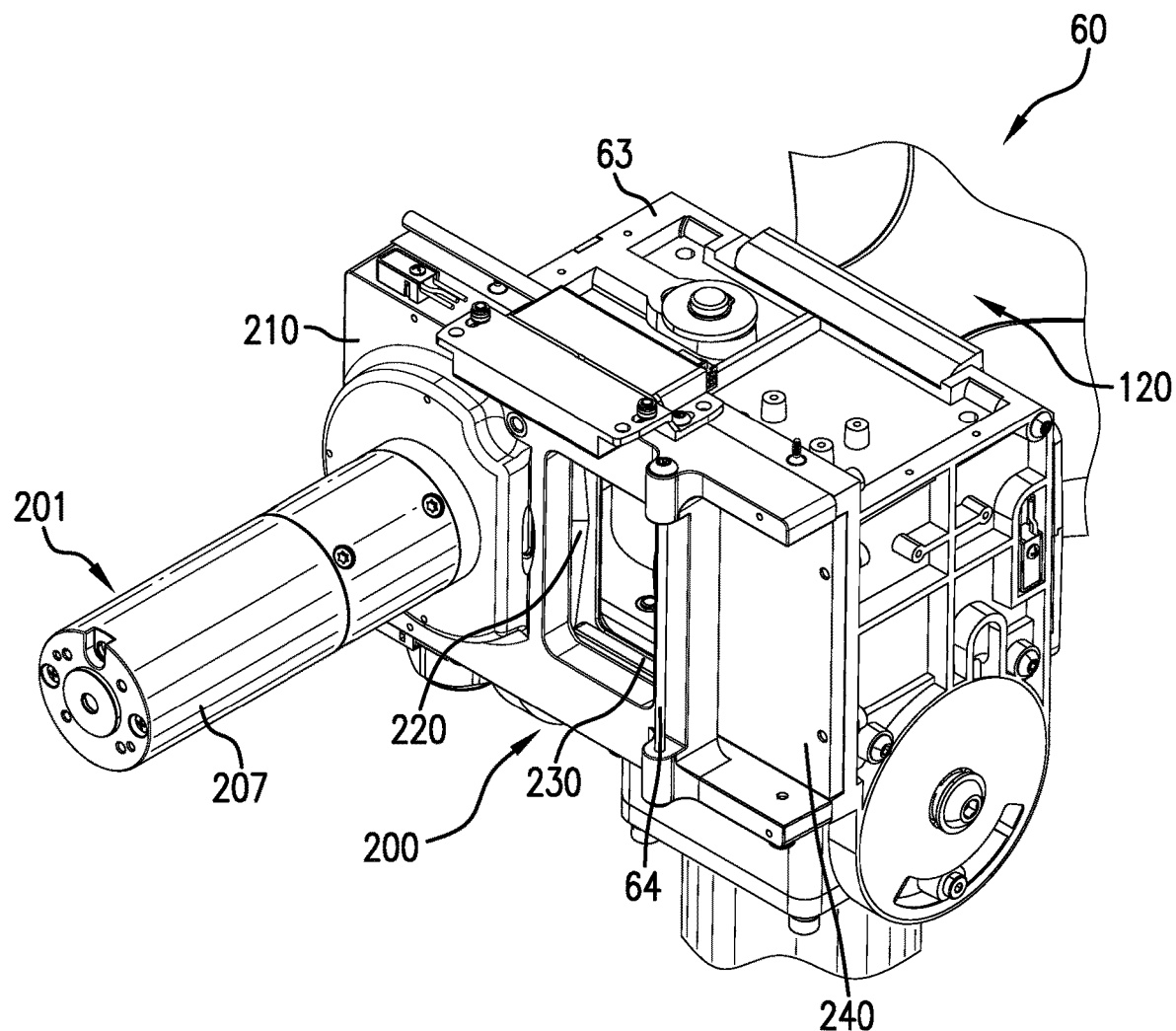
FIG. 11 is a top-rear perspective view of the dunnage conversion machine shown in FIGS. 1-7, with the enclosure and an outlet chute of the dunnage conversion machine removed.
Figure 12:
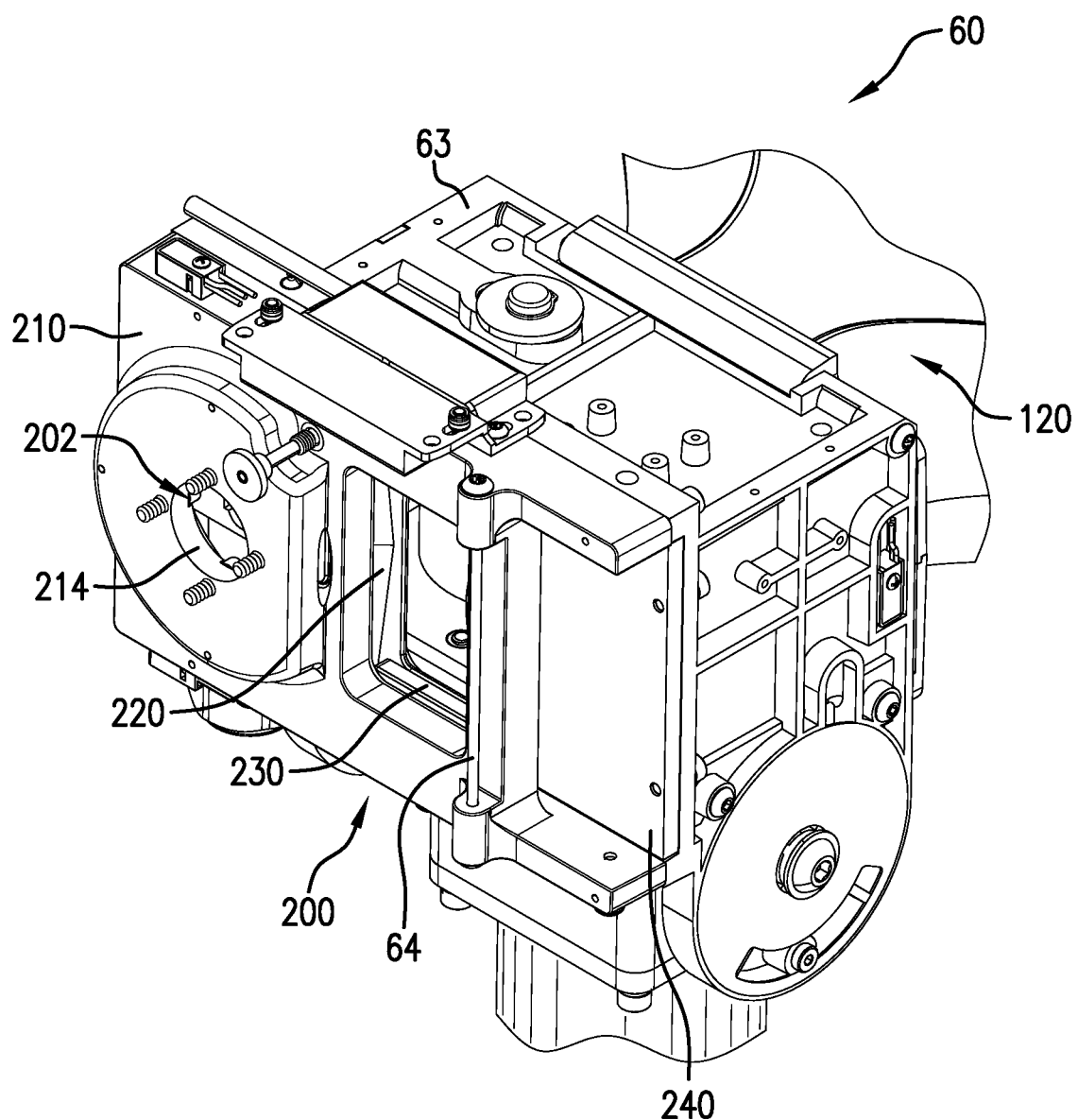
FIG. 12 is a top-rear perspective view of the dunnage conversion machine shown in FIGS. 1-7 and 11, with the enclosure, the outlet chute, and a cutting motor assembly of the dunnage conversion machine removed.
Figure 13:
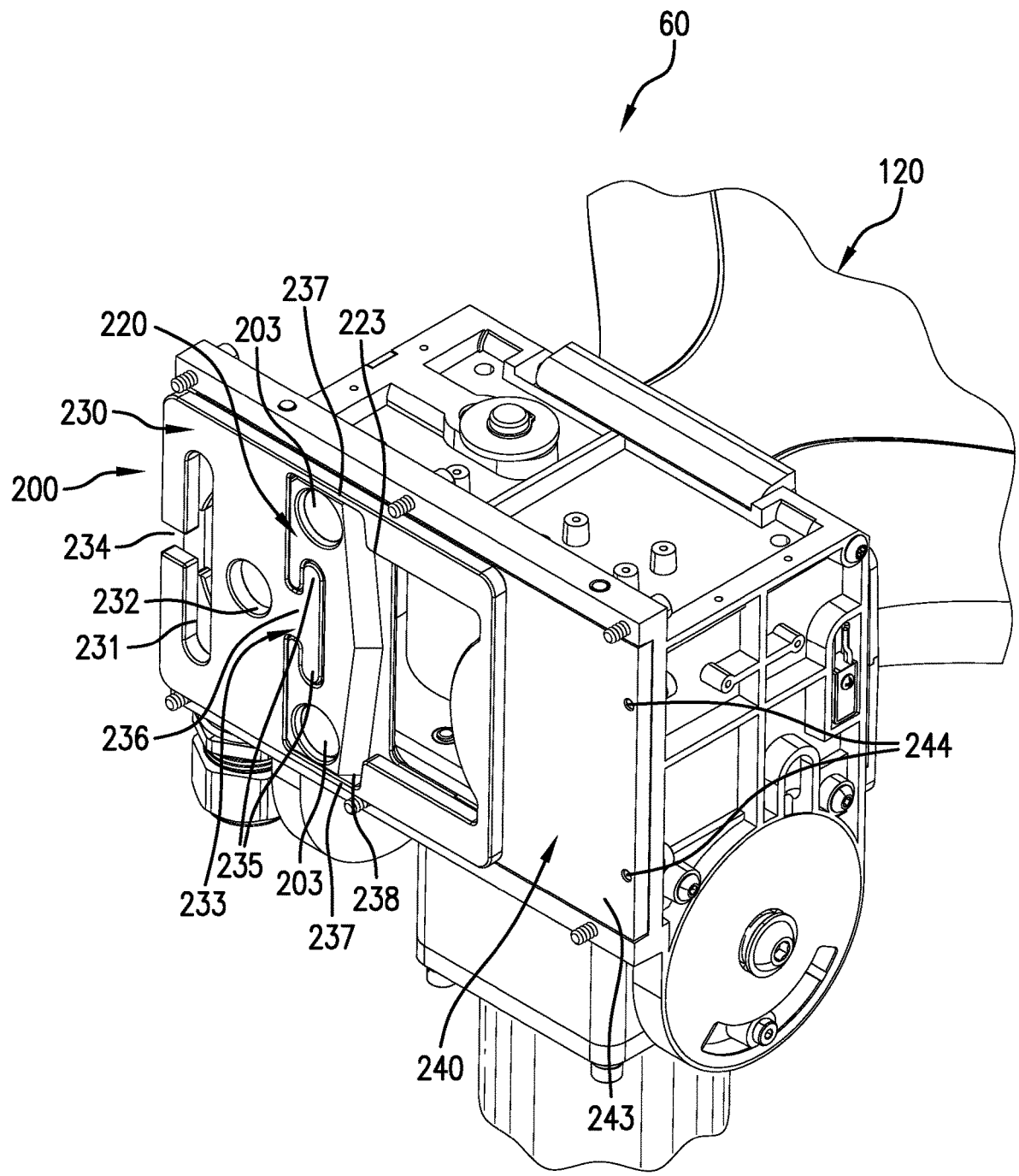
FIG. 13 is a top-rear perspective view of the dunnage conversion machine shown in FIGS. 1-7, 11, and 12, with the enclosure, the outlet chute, the cutting motor assembly, and a cover of the dunnage conversion machine removed.
Figure 14:
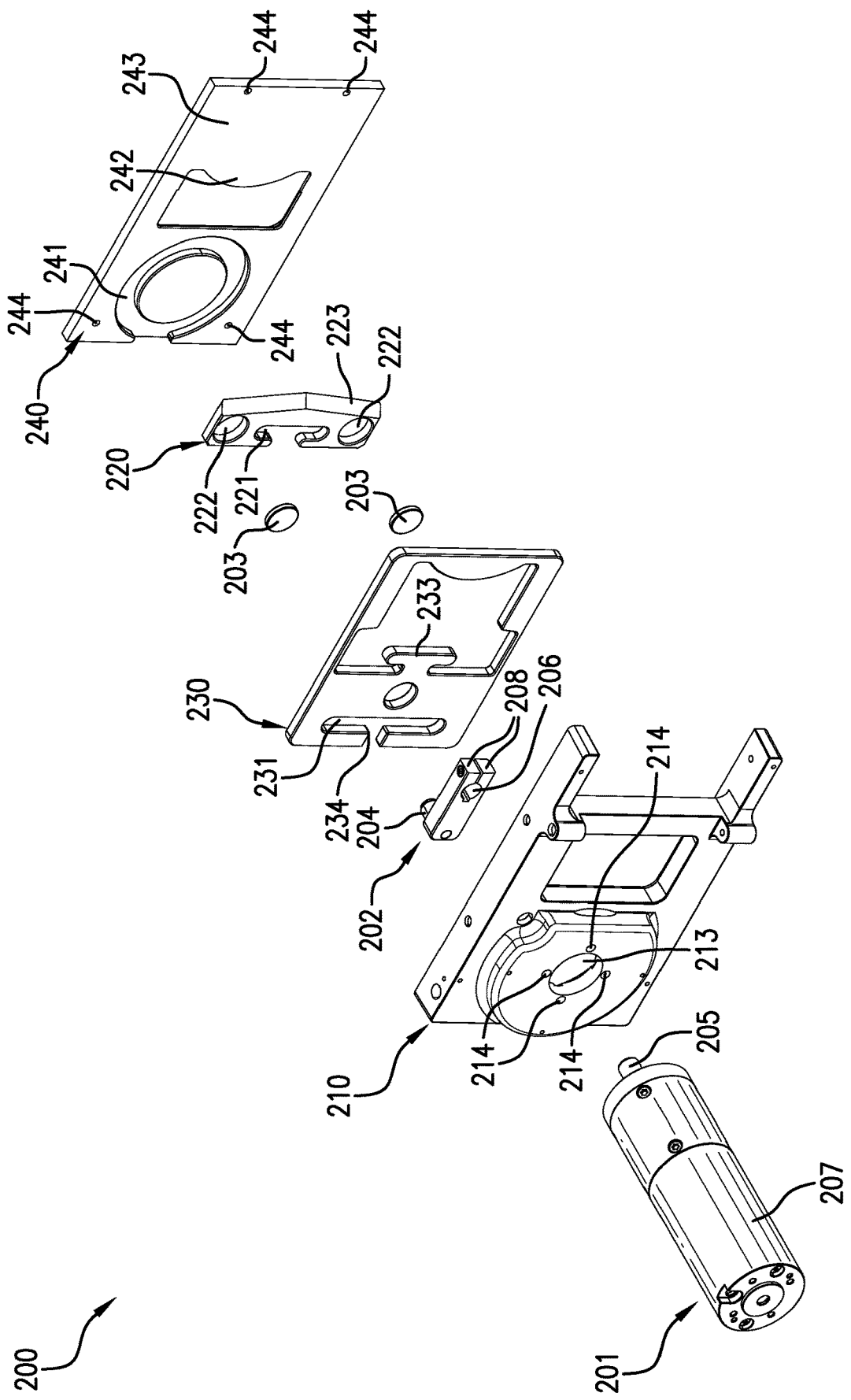
FIG. 14 is an exploded, side-rear perspective of a cutting assembly of the dunnage conversion machine shown in FIGS. 1-7 and 11-13.
Figure 15:
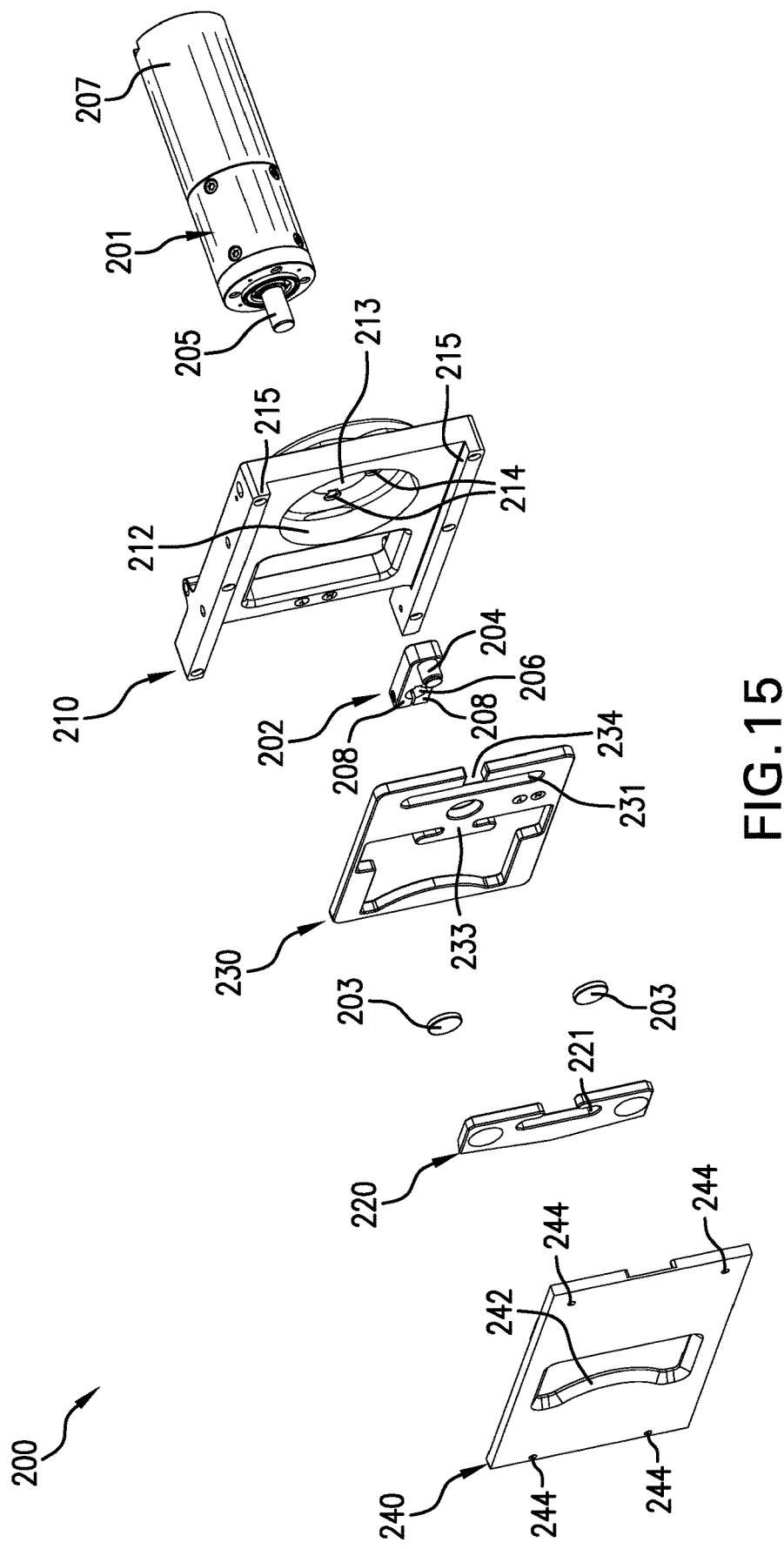
FIG. 15 is an exploded, side-front perspective of the cutting assembly shown in FIG. 13.

FIGS. 11-13 depict the cutting mechanism 200 of the dunnage conversion machine 60, coupled to the frame 63. Certain components of the dunnage conversion machine are not shown in FIGS. 11-13, for clarity of illustration. In particular, FIG. 11 depicts the cutting mechanism 200 and the frame 63 without the enclosure 61 and the outlet chute 62. FIG. 12 depicts the cutting mechanism 200 and the frame 63 without the enclosure 61, the outlet chute 62, and the cutting motor assembly 201. FIG. 13 depicts the cutting mechanism 200 and the frame 63 without the enclosure 61, the outlet chute 62, the cutting motor assembly 201, and a cover 210 of the dunnage conversion machine 60. FIGS. 14 and 15 are exploded views of the cutting mechanism 200.

The cutting mechanism 200 includes the cutting motor assembly 201, the cover 210, a crank 202, a shuttle 230, magnets 203, a cutting portion 220, and an anvil portion 240.

As can be seen in FIGS. 14 and 15, the cover 210 defines a recess 212 configured to receive the crank 202; a hole 213 configured to receive a component of the cutting motor assembly 201; and apertures 214 configured to receive a fastener. The cover 210 also includes sidewalls 215, visible in FIGS. 18-24, that define a space with the cover 210 to receive the shuttle 230.

Referring still to FIGS. 14 and 15, the cutting motor assembly 201 includes a motor body 207, and a motor extension 205 extending from the motor body 207. The crank 202 includes a crank arm 204, and legs 208 defining a hole 206 therebetween.

The cutting motor assembly 201, the cover 210, and the crank 202 are assembled by inserting the motor extension 205 through the hole 213 in the cover 210; and connecting the motor body 207 to the cover 210 using fasteners that are inserted through the apertures 214 in the cover 210, and engage the motor body 207. The crank 202 is connected to the cutting motor assembly 201 by inserting the crank 202 into the recess 212 in the cover 210, and inserting the motor extension 205 through the hole 206 in the crank 202. The legs 208 that define the hole 206 are compressed together to secure the crank 202 to the motor extension 205, so that rotation of the motor extension 205 imparts a corresponding rotation to the crank 202.

Figure 16:
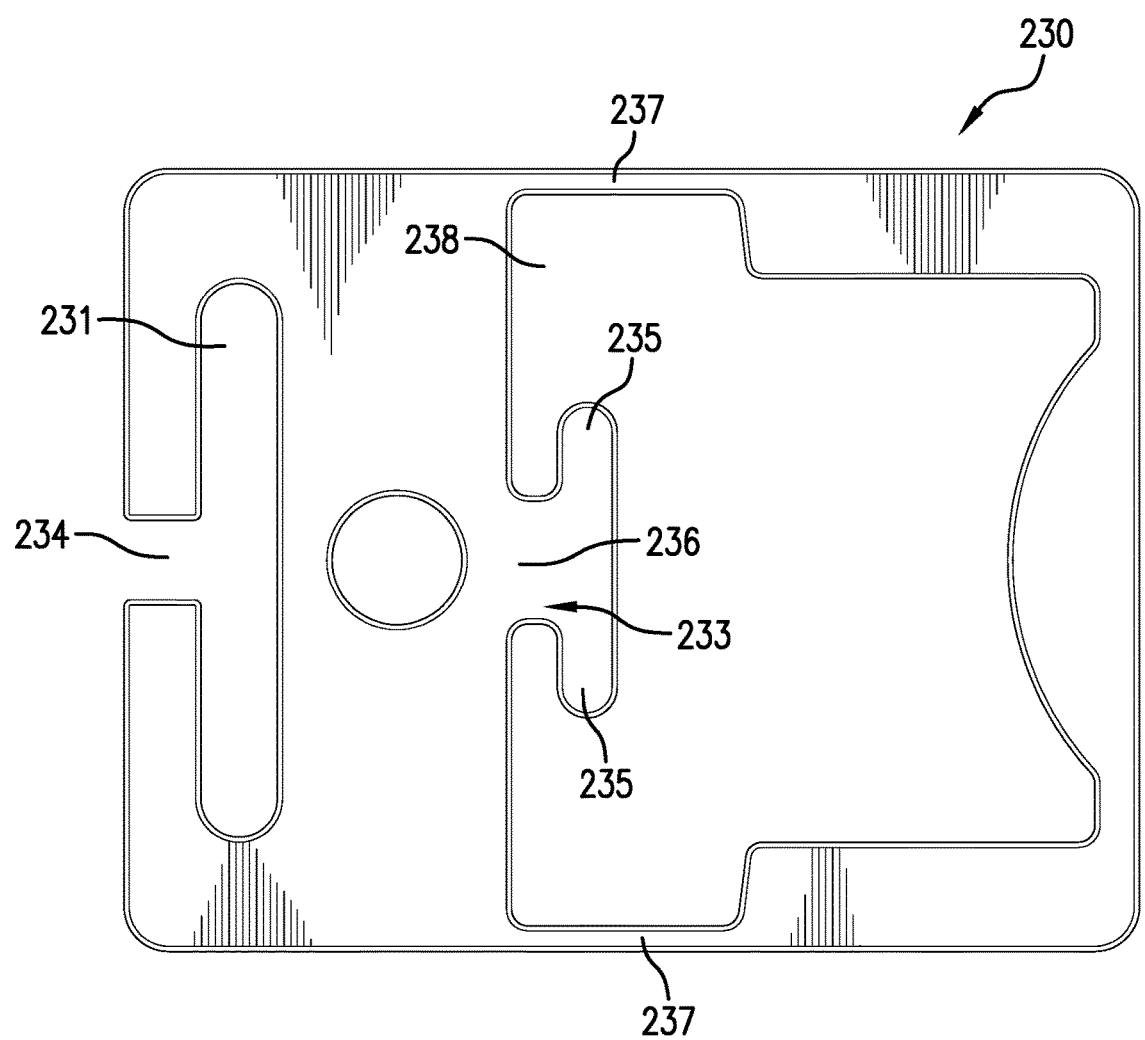
FIG. 16 is a rear view of a shuttle of the cutting assembly shown in FIGS. 14 and 15.

As discussed below, the shuttle 230 is configured to engage the cutting portion 220 so that movement of the shuttle 230 imparts a corresponding movement to the cutting portion 220. Referring to FIG. 16, shuttle 230 includes a mating feature in the form of, for example, an arm or a protrusion 233 that couples the shuttle 230 to the cutting portion 220. The protrusion 233 has a base 236 and wings 235. The wings 235 extend laterally from the base 236, at a substantially perpendicular angle in relation to the base 236. In alternative embodiments, the wings 235 can extend from the base 236 at other angles, e.g., about 10 degrees to about 80 degrees. Also, alternative embodiments of the protrusion 233 can have less, or more than two wings 235. The protrusion 233 can include one wing 235, for example, to help minimize manufacturing costs. More than two wings 235 can be used, for example, to enhance the engagement between the protrusion 233 and the cutting portion 220.

The protrusion 233 and the remainder of the shuttle 230 are integrally formed. In alternative embodiments, the protrusion 233 can be removable from the remainder of the shuttle 230, for example, to provide for greater customizability by the user by allowing the user to choose a particular design for the protrusion 233.

In other alternative embodiments, a protrusion 233 can be formed on the cutting portion 220, and the shuttle 230 can have an opening configured to receive the protrusion 233. This feature can allow the cutting portion 220 to have more material along a central portion thereof to, for example, increase the structural integrity of the cutting portion 220. Also, the shuttle 230 can be configured with additional engagement features, such as a additional recess and a magnet disposed in the recess, to increase the engagement of the shuttle 230 to a backing surface (discussed below).

As can be seen in FIG. 16, the shuttle 230 includes sidewalls 237 that define an opening 238 therebetween. The opening 238 is configured to receive the cutting portion 220. The sidewalls 237 can help enhance the lateral stability of the cutting portion 220 in relation to the shuttle 230.

Referring to FIGS. 14 and 15, the cutting portion 220 defines a receiving slot 221 configured to receive the protrusion 233 of the shuttle 230. The receiving slot 221 is sized and shaped to that the protrusion 233 fits within the receiving slot 221 with minimal clearance. The engagement of the protrusion 233 and the cutting portion 220, along with the engagement of the cutting portion 220 and the sidewalls 237, restrain the cutting portion 220 in relation to the shuttle 230. For example, the base 236 assists in limiting movement of the cutting portion 220 relative to the shuttle 230 in a first direction, i.e., lateral movement, while the wings 235 assist in limiting movement of the cutting portion 220 relative to the shuttle 230 in a second direction different than the first direction, i.e., in the cutting direction B and along the cutting plane, as discussed further below. In this manner, movement of the shuttle 230 moves the cutting portion 220.

As can be seen in FIG. 16, the shuttle 230 defines a track in the form of, for example, a linear guide slot 231. The shuttle 230 also includes an access opening to the guide slot in the form of, for example, an entry slot 234. The guide slot 231 is configured to receive an end portion of the crank arm 204 of the crank 202, so that the crank arm 204 can translate between the ends of the guide slot 231. The guide slot 231 thus defines a linear axis along which the crank arm 204 can translate. The entry slot 234 extends in a direction transverse to the axis of the guide slot 231. The entry slot 234 extends between a side of the shuttle 230, and the guide slot 231. The entry slot 234 thus facilitates entry and exit of the crank arm 204 into, and from the guide slot 231.

Referring to FIG. 14, the cutting portion 220 defines recesses 222. The recesses 222 are configured to receive the magnets 203 of the cutting mechanism 200, so that the magnets 203 can apply a magnetic force that holds the cutting portion 220 against a backing surface, i.e., a backing surface 243 of the anvil portion 240, which is mounted on the frame 63 and remains stationary in relation the cutting portion 222 and the shuttle 230 as the cutting portion 222 and the shuttle 230 move in a cutting direction B denoted in FIG. 17. The magnetic force helps to maintain the cutting portion 220 flush against the backing surface 243 as the cutting portion 222 slides along the backing surface 243 in the cutting direction. Where the backing surface is substantially planar, like the backing surface 243, the engagement of the cutting portion 220 to the backing surface causes the cutting portion 220 to translate along a cutting plane. Thus, when the cutting portion 220 is mated to the shuttle 230 in the above-noted manner, and the magnets 203 magnetically couple the cutting portion 220 to the anvil portion 240, the cutting portion 220 is driven linearly, in the cutting direction B, by movement of the shuttle 230.

In alternative embodiments, the cutting portion 220 can have a different number of recesses and a different number of corresponding magnets 203 than disclosed herein. For example, some embodiments can include only a single recess for a single magnet, to help minimize manufacturing costs. Other embodiments can include more than two recesses and more than two magnets, to increase the magnetic force coupling the cutting portion 220 to the anvil portion 240. In other alternative embodiments, the cutting portion 220 and the anvil portion 240 can be configured so that the cutting portion 220 is stationary, and the shuttle 230 carries the anvil portion 240 and moves the anvil portion 240 in the cutting direction, in relation to the cutting portion 220.

Figure 18:
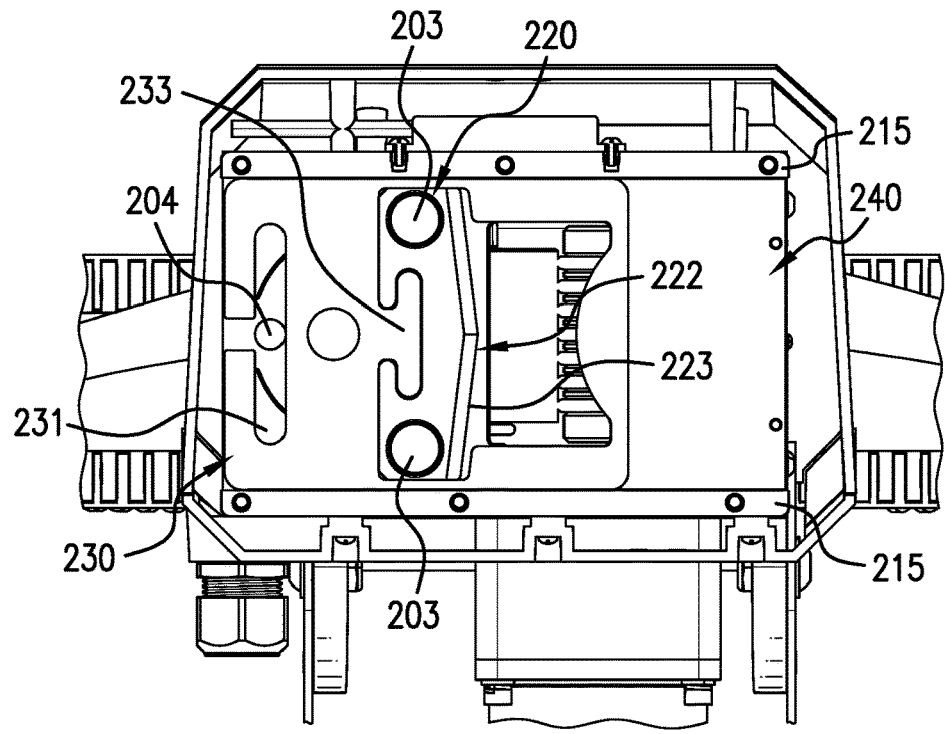
FIG. 18 is a rear view of the dunnage conversion machine shown in FIGS. 1-7 and 11-17, with the enclosure, the outlet chute, the cutting motor assembly, and the cover of the dunnage conversion machine removed, and depicting the cutting mechanism in a home position.
Figure 24:
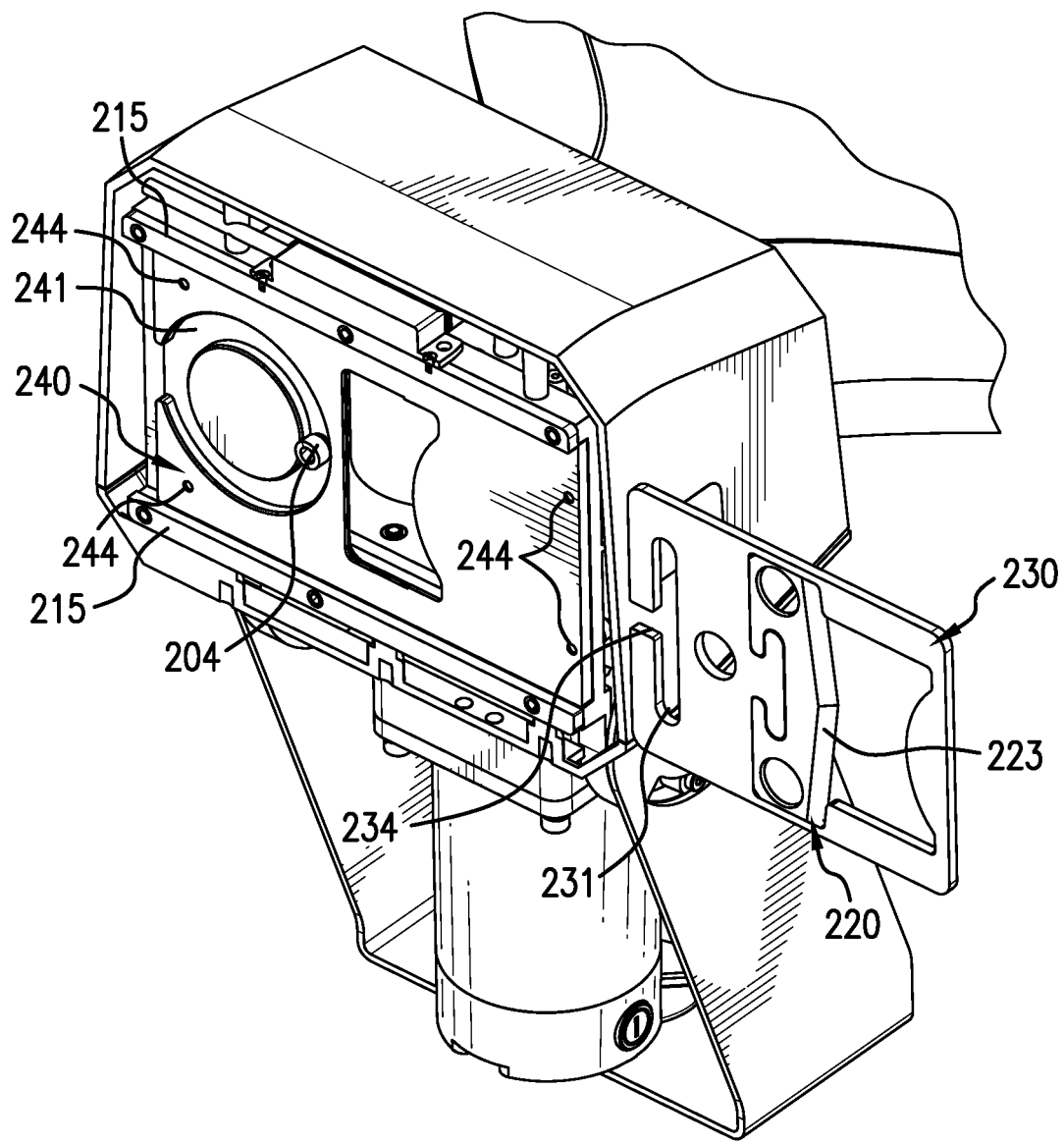

The cutting portion 220 is configured as a blade that includes a cutting edge 223, as shown in FIGS. 14, 18, and 24. The leading end of the cutting edge 223 has a sharp tip that helps the cutting edge 223 to initiate a cut efficiently. The leading end can have other shapes in alternative embodiments. For example, the leading edge can have a curved tip, to avoid the application of excessive much pressure onto a relatively small area of the dunnage being cut.

In alternative embodiments, the cutting edge 223 can have a rounded or blunt tip to initiate the cut. For example, where the cutting portion 220 pushes the dunnage against an opposing surface having a sharp edge, such as an anvil having a sharp edge, the cutting portion 220 can cut the dunnage without a sharp edge on the cutting portion 220, provided the cutting portion 220 is moved at a sufficient speed to cut the dunnage. In other alternative embodiments, the cutting edge 223 can be serrated, and can be equipped with multiple teeth, an edge with shallow teeth, or other configurations. A plurality of teeth are defined by points separated by troughs positioned therebetween.

The cutting edge 223 is depicted as having a single tip that forms the leading end of the cutting edge 223. In alternative embodiments, the cutting edge 223 can include more than one tip, to facilitate easier cutting of the dunnage. The tips can be staggered such that there is one or more leading tip and multiple trailing tips. Alternatively, the tips can be configured so that all of the tips are equally aligned, and there are no leading or trailing tips.

The cutting edge 223 is symmetrically disposed about the tip of the cutting edge 223, so that the cutting edge 223 includes two substantially identical halves. As can be seen in FIGS. 14, 18, and 24, each half is substantially straight, and is angled in relation to the direction of travel of the cutting edge 223 so that the cutting edge 223 pushes a portion of the dunnage laterally, toward the sides of the cutting portion 220, as the cutting edge 223 cuts the dunnage. In alternative embodiments, the cutting edge 223 can be non-symmetrically disposed about the tip of the cutting edge; and/or the halves of the cutting edge 223 can have a curvilinear shape, to alter the distribution of the pressure applied by the cutting edge 223 to the dunnage.

In alternative embodiments, the cutting portion 220 can have a configuration other that a blade. For example the cutting portion 220 be configured as a wire, a knife, or another type of cutting device in alternative embodiments.

As can be seen in FIGS. 14 and 24, the anvil portion 240 defines a substantially C-shaped track 241, and apertures 244. The anvil portion 240 includes an anvil 242, and the backing surface 243. The backing surface 243 is substantially smooth, to facilitate sliding movement of the cutting portion 220 over the backing surface 243. As noted above, the magnets 203 hold the cutting portion 220 flush against the backing surface 243.

As also noted above, a portion of the crank arm 204 of the crank 202 extends through the guide slot 231 of the shuttle 230. An adjoining end portion of the crank arm 204 extends into the track 241 of the anvil portion 240. The end portion of the crank arm 204 can move in a substantially C-shaped path within the track 241. The track 241 is visible in FIG. 14.

The apertures 244 in the anvil portion 240 are configured to receive fasteners that secure the anvil portion 240 to the frame 63 of the dunnage conversion machine 60, as can be seen in FIGS. 11-13. As noted above, the anvil portion 240 remains stationary in relation to the cutting portion 220 and the shuttle 230.

As can be seen in FIGS. 14 and 15, the anvil 242 has a convex leading end, and substantially straight lateral sides. The convex shape of the leading end allows for a portion of the dunnage that is pressed against the anvil 242 to be bunched up against a leading end of the convex shape, while the rest of the dunnage can wrap around the convex edge. This in turn facilitates the pressure against the anvil 242 to be distributed more equally by the dunnage being pushed to the side when, for example, the dunnage is cut by an opposing cutting edge, i.e., the cutting edge 223 of the cutting portion 220.

The arcuate, convex profile of the leading end of the anvil 242 more smoothly distributes the pressure of the bunched material against the anvil portion 240. However, in other embodiments, the leading end of the anvil 242 can have a different shape, such as a sharp tip, to provide alternative pressure distributions against the dunnage. Similarly, the anvil portion 240 can have two or more leading ends, to provide alternative pressure distributions against the dunnage.

Figure 17:
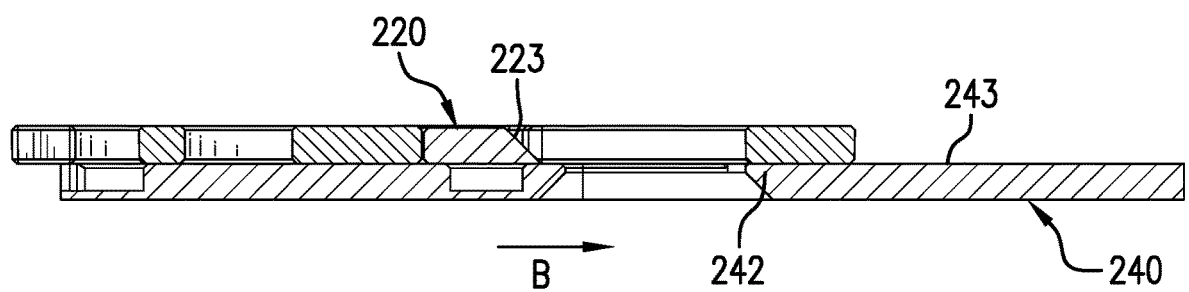
FIG. 17 is a top view of a cutting portion and an anvil portion of the cutting assembly show in FIGS. 14-16.

FIG. 17 depicts the cutting portion 220 and the anvil portion 240 from above, and in an assembled state. The cutting portion 220 and the backing surface 243 of the anvil portion 240 sit flush against each other, to help ensure a clean cut of the dunnage as the cutting portion 220 moves along the cutting plane in relation to the anvil portion 240, in the cutting direction B. The cutting edge 223 is beveled, as can be seen in FIGS. 13, 14, and 17, so that the dunnage is pushed away from the cutting portion 220 as the dunnage is cut. The beveled surface of the cutting edge 223 has a substantially straight, or linear slope. The beveled surface of the cutting edge 223 can be curvilinear in alternative embodiments. For example, the beveled surface can have a concave profile, i.e., the beveled surface can be curved inward toward the anvil portion, to help increase the sharpness of the cutting edge 223.

As can be seen in FIGS. 14 and 15, the surface of the anvil 242 that contacts and restrains the dunnage has a convex profile, and is blunt, i.e., surface is not angled or beveled to form a sharp cutting edge. In alternative embodiments, the noted surface of the anvil 242 can be configured with a sharp cutting edge, to assist in cutting the dunnage as the cutting portion 220 moves in the cutting direction B.

Figure 19:
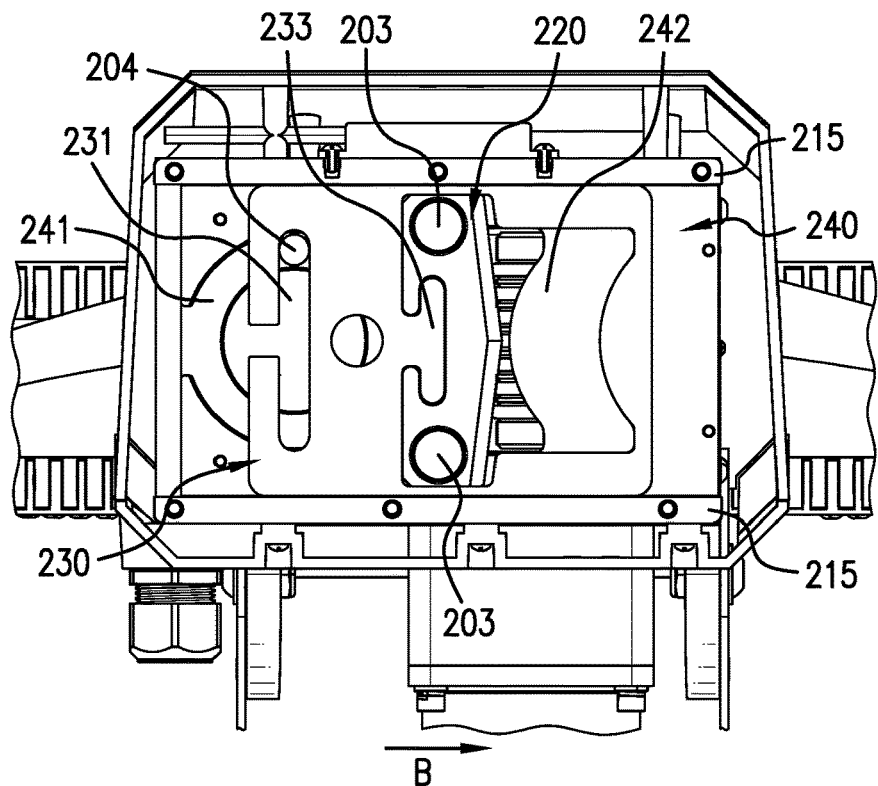
FIG. 19 is a rear view of the dunnage conversion machine shown in FIGS. 1-7 and 11-18, with the enclosure, the outlet chute, the cutting motor assembly, and the cover of the dunnage conversion machine removed, and depicting the cutting mechanism in an intermediate position.
Figure 20:
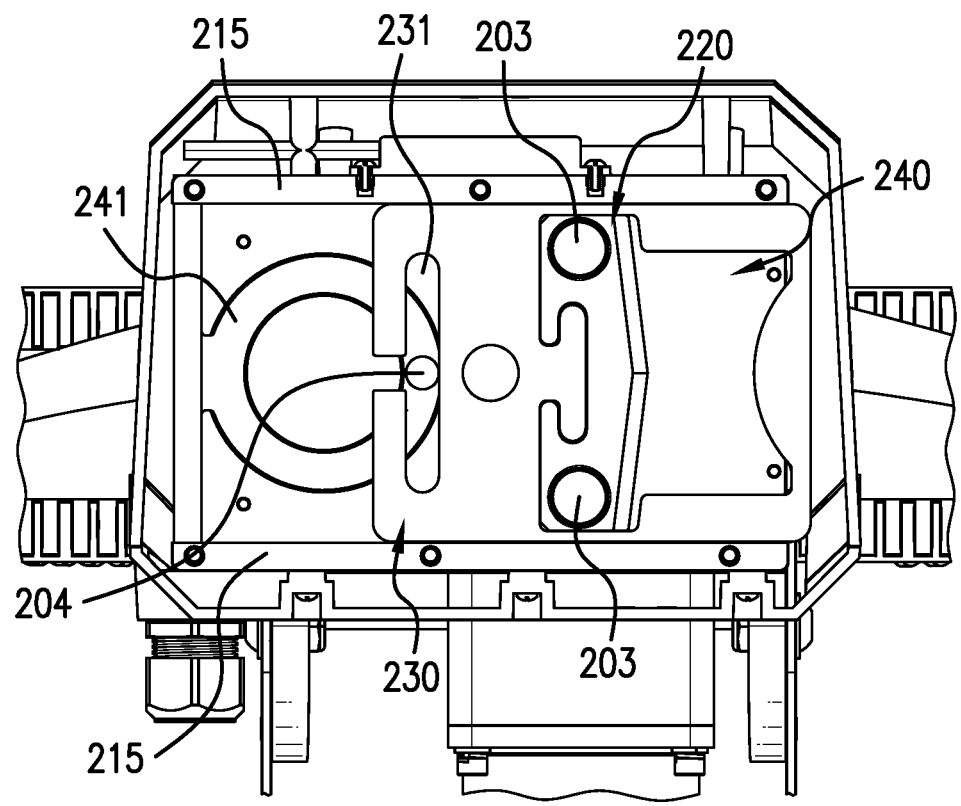
FIG. 20 is a rear view of the dunnage conversion machine shown in FIGS. 1-7 and 11-19, with the enclosure, the outlet chute, the cutting motor assembly, and the cover of the dunnage conversion machine removed, and depicting the cutting mechanism in an end position.

FIGS. 18-20 depict the assembled cutting mechanism 200 in use. In the assembled state, the cutting portion 220 and the anvil 242 define a window through which the dunnage passes after being converted by the drive mechanism 300 as discussed below. FIG. 18 depicts the cutting mechanism 200 in a home position. In the home position, the cutting portion 220 is at the farthest distance from the anvil 242, and the window is at its largest size. Also, the crank arm 204 of the crank 202 is positioned at the approximate mid-point of the guide slot 231. When in this central position, the crank arm 204 is aligned with the entry slot 234. This is the position of the crank arm 204 and the crank 202 at the start of a cutting cycle. In alternative embodiments, the crank arm 204 can be located at other positions within the guide slot 231 at the start of the cutting cycle.

FIG. 19 depicts the cutting mechanism 200 in an intermediate position. The crank arm 204 has rotated along the track 241 by about 90 degrees in the clockwise direction, and has translated toward an end of the guide slot 231. This motion of the crank arm 204 causes the crank arm 204 to move the shuttle 230, and the cutting portion 220 engaged thereto, in the cutting direction B. The shuttle 230 is situated between, and its restrained and guided by the sidewalls 215 of the cover 210, as can be seen in FIGS. 18-24, which in turn causes the shuttle 230 to move linearly, in the cutting direction B, when the crank arm 204 is rotated.

Because the cutting portion 220 is coupled to the shuttle 230 by way of the protrusion 233, the cutting portion 220 moves in the cutting direction B along with the shuttle 230. Also, the magnets 203 that magnetically couple the cutting portion 220 to the anvil portion 240 help to maintain the cutting portion 220 flush against the backing surface 243 of the anvil portion 220 as the cutting portion 220 slides against the backing surface 243, in the cutting direction B.

As the cutting mechanism 200 moves toward, and past its intermediate position and the cutting portion 220 moves in the cutting direction B, the window defined between the cutting portion 220 and the anvil 242 decreases in size. More specifically, the window decreases in size as the cutting edge 223 of the cutting portion 220 approaches the leading end of the anvil 242. When dunnage is located within the window, as during normal operation of dunnage conversion machine 60, the cutting edge 223 initiates a cut to the dunnage when the cutting mechanism 200 approximately is in its intermediate position. The intermediate position is depicted as the crank arm 204 being positioned at a quarter turn along the track 241 in relation to the position of the crank arm 204 when the cutting mechanism 200 is in the home position. In alternative embodiments, however, the cutting mechanism 200 can be configured so that the "intermediate position" can be any position of the cutting mechanism 200 between the home position and an end position of the cutting mechanism 200, as discussed below.

FIG. 20 depicts the cutting mechanism 200 in its end position. In this position, the crank arm 204 has rotated along the track 241 to a position opposite, i.e., offset by about 180 degrees, from the position of the crank arm 204 when the cutting mechanism 200 is in the home position. As also can be seen in FIG. 20, the window previously defined between the cutting portion 220 and the anvil 242 has closed, i.e., no longer exists, due to the movement of the cutting portion 220 past the anvil 242. Although not depicted in the figures, the dunnage that was located within the window has been pushed against the anvil 242 and severed by the cutting edge 223 of the cutting portion 220 as the cutting portion 220 advances in the cutting direction B to the position shown in FIG. 20. Thus, the portion of the dunnage that advanced through the window following the previous cutting cycle has been severed to form a separate piece of dunnage. The newly-cut piece of dunnage then exits the dunnage conversion machine 60 by way of the outlet chute 62.

After the cutting mechanism 200 has reached the end position, the continued rotation of the crank arm 204 in the clockwise direction eventually causes the crank arm 204 to return to the home position shown in FIG. 18. The interaction of the crank arm 204, the shuttle 230, and the anvil portion 240 as the crank arm 204 translates within the guide slot 231 and the track 241 causes the cutting mechanism 200 to return to its home position shown in FIG. 18. As can be seen in FIG. 18, the shuttle 230 and the cutting portion 220 have translated in a direction opposite the cutting direction B, and the window between the cutting portion 220 and the anvil 242 has reopened fully and can receive the advancing stream of dunnage as the next cutting cycle begins.

As can be seen in FIG. 20, an end of the shuttle 230 extends past the sidewalls 215 and the anvil portion 240 when the cutting mechanism 200 is in the end position. Alternative embodiments can be configured so that the end of the shuttle 230 does not extend past the anvil portion 240 or the sidewalls 215 when the cutting mechanism 200 is in the end position. For example, the length, i.e., side to side dimension, of the shuttle 230 can be decreased to ensure that the shuttle 230 stays within the bounds defined between the sidewalls 215, to help reduce the space required to accommodate the dunnage conversion machine 60.

Figure 21:
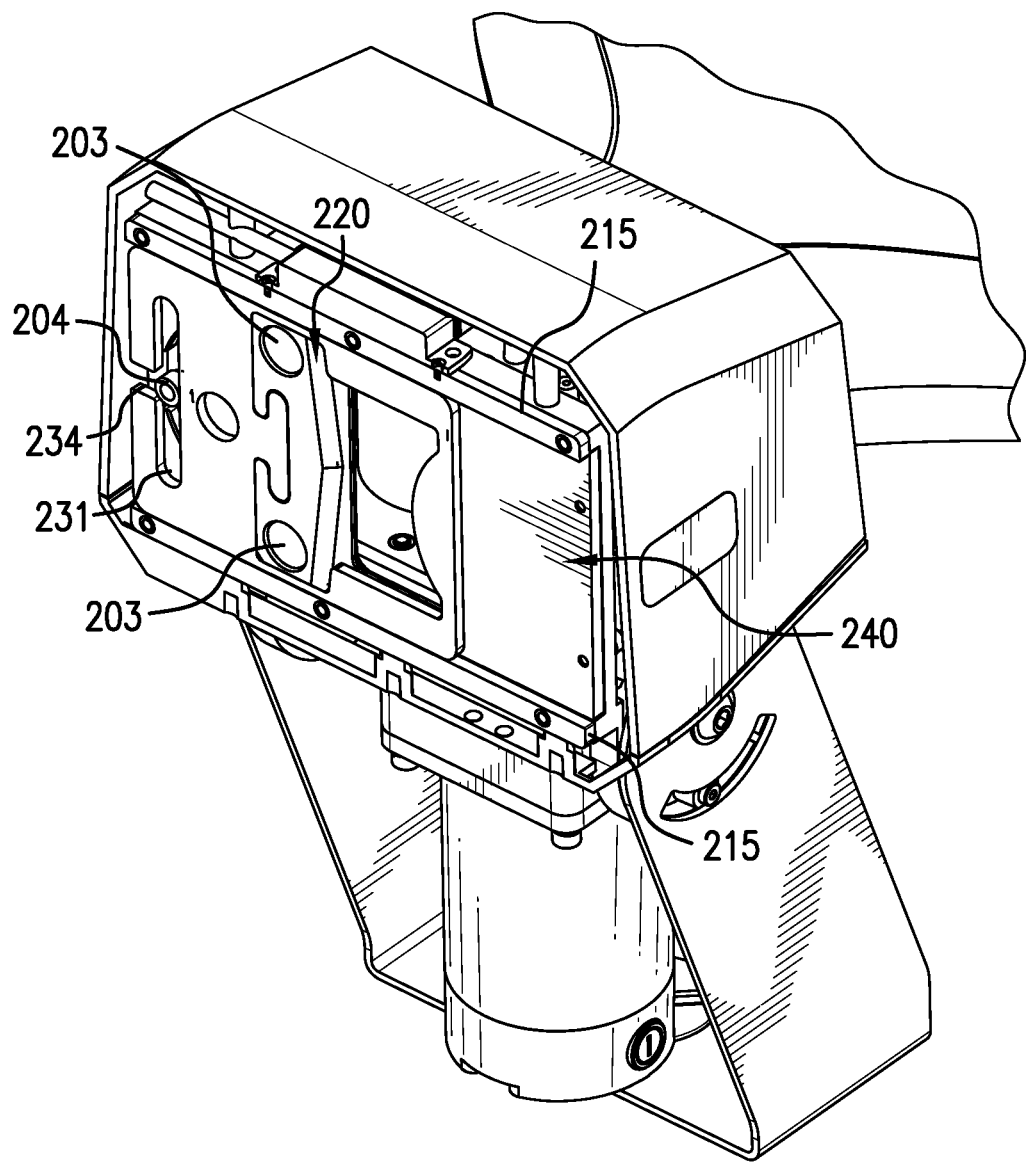
FIGS. 21 and 22 are rear-top perspective views of the dunnage conversion machine shown in FIGS. 1-7 and 11-20, with the enclosure, the outlet chute, the cutting motor assembly, and the cover of the dunnage conversion machine removed, and depicting removal of the cutting mechanism while the cutting mechanism in the home position.
Figure 22:
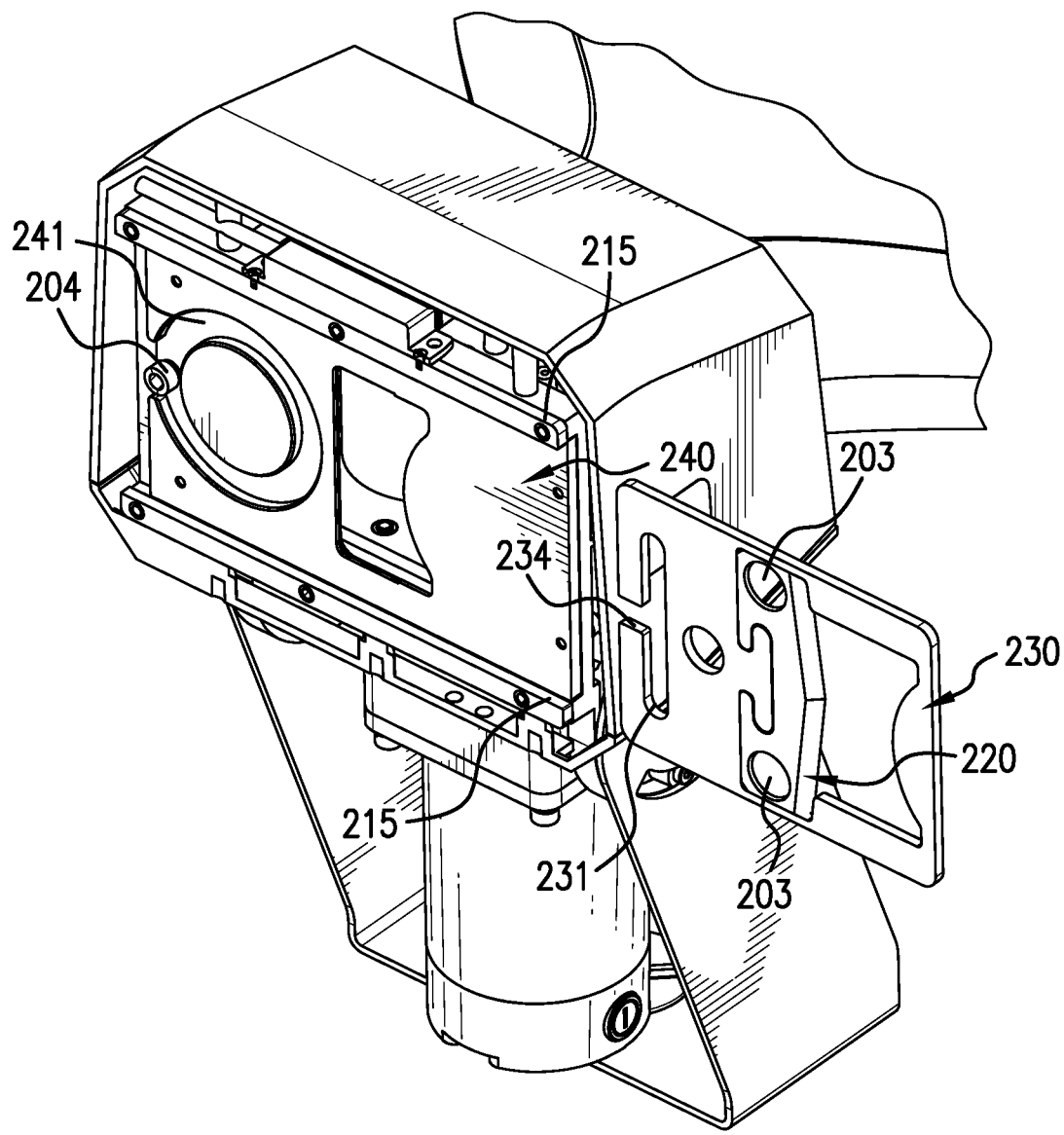
Figure 23:
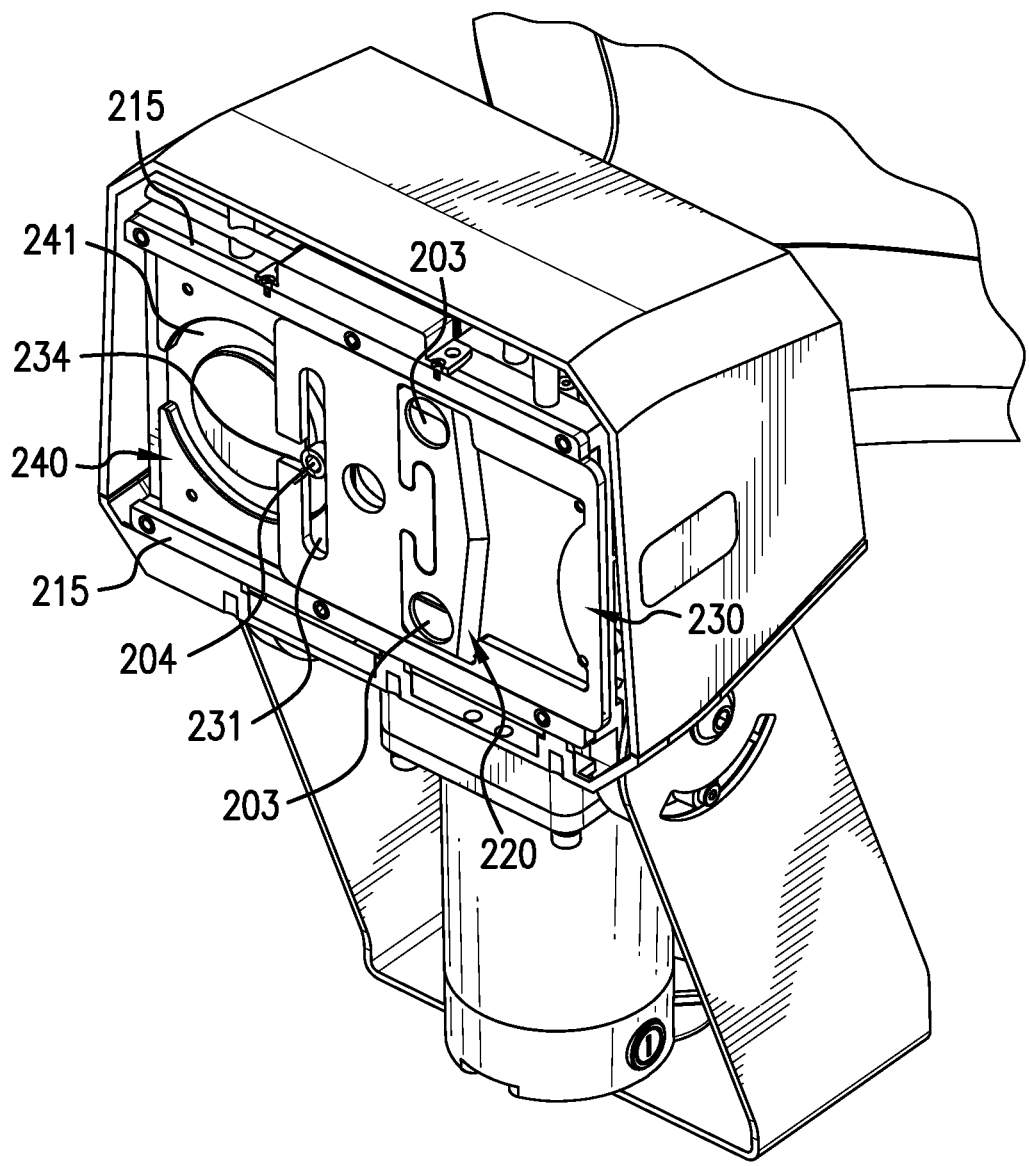
FIGS. 23 and 24 are rear-top perspective views of the dunnage conversion machine shown in FIGS. 1-7 and 11-22, with the enclosure, the outlet chute, the cutting motor assembly, and the cover of the dunnage conversion machine removed, and depicting removal of the cutting mechanism while the cutting mechanism in the end position.

FIGS. 21-24 depict the shuttle 230, the attached cutting portion 220, and the magnets 203 disengaging from the rest of the cutting mechanism 200. In particular, FIGS. 21 and 22 depict the shuttle 230, the cutting portion 220, and the magnets 203 disengaging while the cutting mechanism 200 is in the home position. FIGS. 23 and 24 depict the shuttle 230, the cutting portion 220, and the magnets 203 disengaging while the cutting mechanism 200 is in the end position.

In either of the home or end positions, the shuttle 230 can be disengaged only when the crank arm 204 is aligned with the entry slot 234 in the shuttle 230. When the crank arm 204 is in any other position, i.e., when the cutting mechanism 200 is in the intermediate position of another position between the home and end positions, the crank arm 204 is at a location within the guide slot 231 that is not aligned with the entry slot 234. The resulting interference between the crank arm 204 and the periphery of the guide slot 231 prevents the shuttle 230 from disengaging from the rest of the cutting mechanism 200. This feature can help ensure that the cutting mechanism 200 is not in the process of cutting dunnage when a user attempts to remove the shuttle 230, thereby enhancing the safety of the user.

As can be seen in FIGS. 21-24, the shuttle 230 is disengaged from the rest of the cutting mechanism 200 by moving the shuttle 230 in the cutting direction B, so that the crank arm 204 passes through the entry slot 234. The disengagement path is linear, because the shuttle 230 is limited to linear movement by the sidewalls 215. In alternative embodiments where the shuttle 230 is not limited to linear movement, the shuttle 230 can be disengaged by moving the shuttle 230 along a non-linear disengagement path. A non-linear disengagement path can reduce the potential for the shuttle 230 to be removed or jostled out of position accidentally during normal dunnage-producing operations of the dunnage conversion machine 60, because disengagement of the shuttle 230 under such circumstances requires that the shuttle 230 follow a disengagement path that would not be followed during normal operation.

The disengagement path of the shuttle 230 lies along the cutting plane, because the magnets 203 maintain the cutting portion 220, and by extension, the shuttle 230, flush against the anvil portion 240. The disengagement path can be transverse to the cutting plane in alternative embodiments. For example, in embodiments where the cutting motor assembly 201 can be disengaged from the cutting mechanism 200, the shuttle 230 can be lifted from the anvil portion 240 upon such disengagement, to disengage the shuttle 230 from the cutting mechanism 200.

In the cutting mechanism 200, the shuttle 230 is disengaged by moving the shuttle 230 in the cutting direction B. This feature can reduce the potential for injury to the user if the user loses his or her grip on the shuttle 230 during the disengagement process, because the user's hand will move away, rather than toward, the cutting edge 223 of the cutting portion 220. In alternative embodiments, the shuttle 230 can be disengaged from the cutting mechanism 200 by being offset from, i.e., moved outward from, the sidewalls 215, and then lifted.

FIGS. 25-28 depict the rollers 310, 320 of the drive assembly 300 shown in FIG. 7. The rollers 310, 320 are configured to compress the stock material 19 entering the dunnage conversion machine 60 to convert the stock material 19 into the dunnage 15, and transport the dunnage 15 through, and out of the dunnage conversion machine 60.

Figure 25:
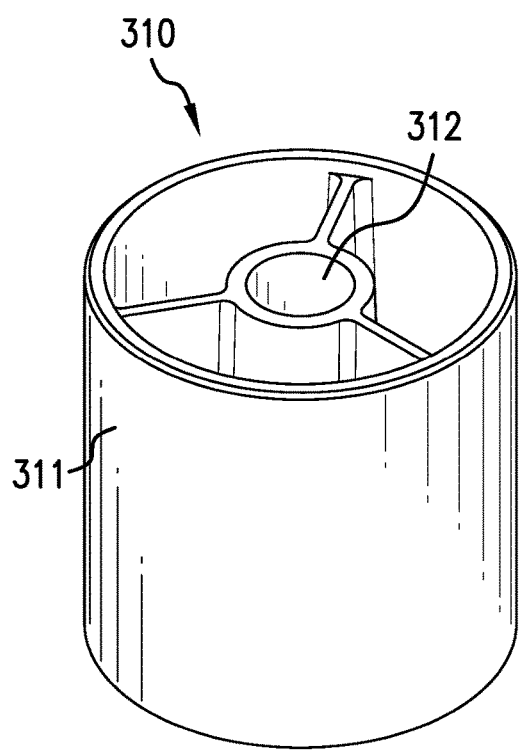
FIG. 25 is a top perspective view of a roller of a drive mechanism of the dunnage conversion machine shown in FIGS. 1-24.
Figure 26:
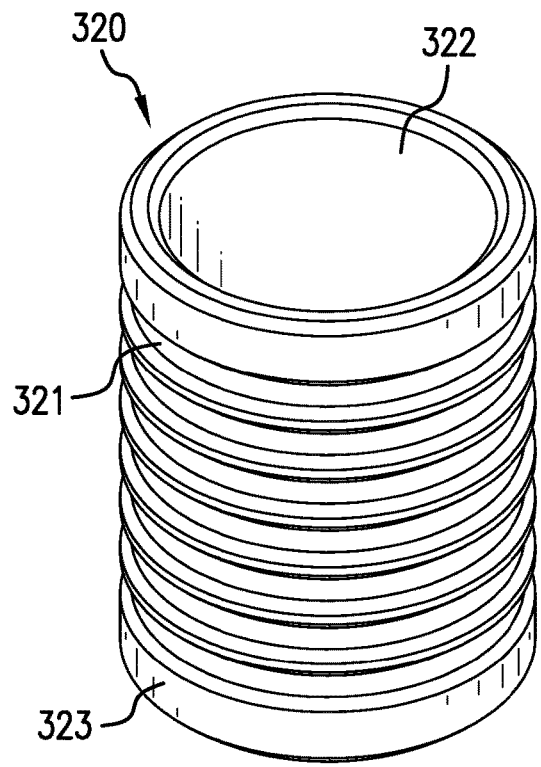
FIG. 26 is a top perspective view of another roller of the drive mechanism of the dunnage conversion machine shown in FIGS. 1-25.

As can be seen in FIG. 25, the roller 310 has an outer surface 311, and defines a channel 312. The channel 312 is configured to receive a spindle 66, shown in FIG. 7, so that the roller 310 can rotate about the spindle 66. The roller 310 is idle, i.e., the roller 310 is not driven by a motor. The roller 310 is driven to rotate by interaction with the rotating roller 320 via of the outer surface 311. In alternative embodiments, the roller 310 can be driven by a motor of the drive assembly 300.

The outer surface 311 of the roller 310 is substantially smooth, and is made of a substantially non-tacky material. For example, the surface 311 can be made of silicone. In alternative embodiments, the outer surface 311 of the roller 310 can be non-smooth.

An outer surface of the roller 320 has a shape or profile different than that of the roller 310. The roller 320 defines a channel 322, visible in FIG. 26. The channel 322 is configured to receive a driving component (not shown) of the feed motor 301, so that the feed motor 301 can drive the roller 320 in rotation. In alternative embodiments, the roller 320 can be idle, and can be driven by the roller 310.

Figure 27:
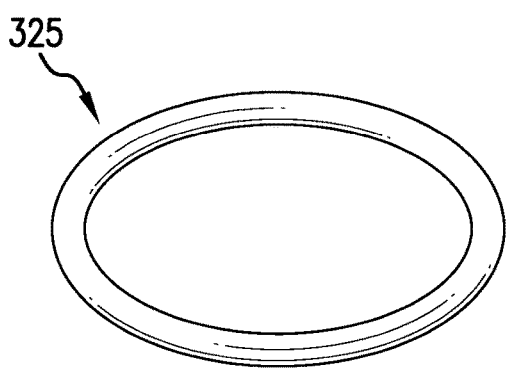
FIG. 27 is a top perspective view of a ridge of the drive mechanism of the dunnage conversion machine shown in FIGS. 1-26.
Figure 28:
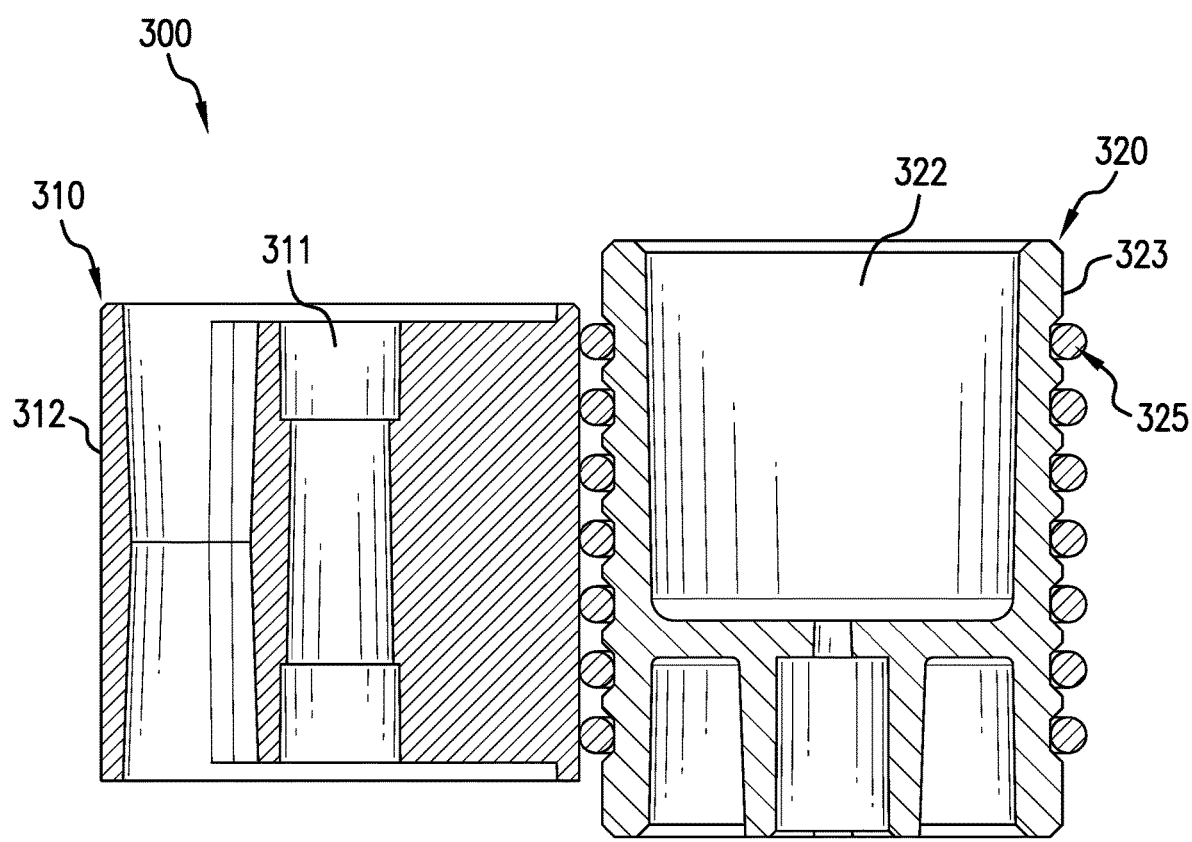
FIG. 28 is a cross-sectional view of the rollers and the ridge of the drive mechanism of the dunnage conversion machine shown in FIGS. 1-27.

The roller 320 includes an outer surface 323. The outer surface 323 defines a plurality of circumferentially-extending grooves 321. The grooves 321 are positioned in a side by side relationship along the length, or height, of the roller 320; and each groove 321 is symmetrically disposed about the longitudinal axis of the roller 320. A lower, or inner end of the each groove 321 is defined by a surface of the roller 320 that, when viewed from the perspective of FIG. 28, is substantially perpendicular to the longitudinal axis of the roller 320. Each groove 321 is configured to receive a corresponding toroid-shaped ridge 325 of the roller 320, as can be seen in FIG. 28. FIG. 27 depicts one of the ridges 325 by itself.

The ridges 325 can be, for example, O-rings formed from a pliable material. The ridges 325 act as non-planar contact surfaces that press against the outer surface 311 of the roller 310, as shown in FIG. 28. Each ridge 325 has a substantially circular cross section, and is sized to extend past the outer surface 323 of the roller 320. As shown in FIG. 28, the ridges 325 extend past the outer surface 323 by substantially the same distance. The ridges 325 thus define projections, and peaks and valleys, on the outer surface of the roller 320.

The ridges 325 and the remainder of the roller 320 can be unitarily formed in alternative embodiments. For example, the projections, and the peaks and valleys defined by the ridges 325 can be formed on a one-piece embodiment of the roller 320.

During operation of the dunnage conversion machine 60, the stock material 19 is drawn by, and between the rollers 310, 320, from the supply station 13 and via the intake 100. The ridges 325 and the opposing outer surface of the 311 of the roller 310 exert a pressure against the stock material 19, with the pressure profile varying along the width, or transverse direction, of the stock material 19. This pressure crumples and otherwise deforms the stock material 19, converting the stock material 19 into dunnage.

The ridges 325 include a leading end from the surface 323 that is substantially perpendicular from the surface 323. In alternative embodiments, the ridges 325 can have a leading end at a different angle from the surface 323 to provide alternative pressure profiles against the roller 310. For example, the ridges 325 can be shaped to have a leading end between 0-45° from the surface of the roller 320.

In alternative embodiments, the ridges 325 can have a shape other than a toroid, and/or can have a non-circular cross section, to produce a pressure profile different than that produced by the ridges 325, which in turn can vary the shape of the dunnage produced by the dunnage conversion machine 60. For example, alternative embodiments of the ridges 325 can have one or more planar surfaces defining exterior-facing bends.

Also, in alternative embodiments the ridges 325 and the grooves 321 can be configured so that the ridges 325 extend past the outer surface 323 of the roller 320 by different distances, to further vary the pressure profile produced by the ridges 325 and the outer surface 311 of the roller 310. Also, alternative embodiments of the roller 320 can be configured so that the grooves 321 extend in planes that are tilted, i.e., non-perpendicular to, the longitudinal axis of the roller 320. Also, one or more of the grooves 321 can have an orientation that is different than the orientations of the other grooves 321.

Alternative embodiments of the system 10 can be equipped with a dunnage conversion machine 60 that includes conventional rollers, or devices that convert the stock material 19 to dunnage 15 using hardware other than rollers, such as a paper crumpler.

One having ordinary skill in the art should appreciate that there are numerous types and sizes of dunnage for which there can be a need or desire to produce, accumulate, and/or discharge, and alternate embodiments of the system 10 can be configured to produce such dunnage.

As used herein, the terms "top," "bottom," and/or other terms indicative of direction are used herein for convenience and to depict relational positions and/or directions between the parts of the embodiments. It will be appreciated that certain embodiments, or portions thereof, can also be oriented in other positions. In addition, the term "about" should generally be understood to refer to both the corresponding number and a range of numbers. In addition, all numerical ranges herein should be understood to include each whole integer within the range.

Although certain features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents. Also, while illustrative embodiments of the invention are disclosed herein, it will be appreciated that numerous modifications and other embodiments may be devised by those skilled in the art. For example, the features for the various embodiments can be used in other embodiments, and the appended claims are intended to cover all such modifications and embodiments that come within the spirit and scope of the present invention. For example, the intake 100, and alternative embodiments thereof, can be used in connection with dunnage machines other than the dunnage conversion machine 60. Likewise, the cutting mechanism 200, and alternative embodiments thereof, can be incorporated into dunnage conversion machines that do not include the drive assembly 300. Likewise, the drive assembly 300, and alternative embodiments thereof, can be incorporated into dunnage conversion machines that do not include the cutting assembly 200.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or methods are in any way required for one or more implementations or that these features, elements, and/or methods are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A dunnage conversion machine, comprising:
  a drive mechanism configured to deform a stock material into dunnage; and
  a cutting mechanism comprising a shuttle, and a cutting portion carried by the shuttle so that movement of the shuttle moves the cutting portion to cut the dunnage, wherein:

one of the shuttle and the cutting portion comprises a protrusion, the protrusion having a base and wings extending laterally from the base, the other of the shuttle and the cutting portion is configured to receive the protrusion, the protrusion is configured to engage the other of the shuttle and the cutting portion, said engagement coupling the shuttle to the cutting portion, movement of the cutting portion in relation to the shuttle in a first direction is limited by the base, and movement of the cutting portion in relation to the shuttle in a second direction perpendicular to the first direction is limited by the wings.

2. The dunnage conversion machine of claim 1, wherein the drive mechanism comprises one or more rollers.

3. The dunnage conversion machine of claim 2,
the first roller comprises an outer surface having a first shape; and
the second roller comprises an outer surface having a second shape different than the first shape.

4. The dunnage conversion machine of claim 1, wherein the cutting portion comprises a blade.

5. The dunnage conversion machine of claim 1, further comprising:
an intake comprising an inlet chute configured to feed a line of high-density material to the dunnage conversion machine, wherein:
the inlet chute comprises a first wall having a first surface, and a second wall having a second surface, the first and second surfaces defining an interior channel;
the interior channel is configured to form part of a material path the stock material along which the high-density material is fed to the dunnage conversion machine;
the second surface is configured to form a protrusion that extends toward the first surface; and
the protrusion and an opposing portion of the first surface define a restriction within the interior channel.

6. The dunnage conversion machine of claim 1, further comprising:
an intake comprising:
an inlet chute configured to feed the stock material to the dunnage conversion machine; and
a guide configured to guide the stock material to the inlet chute, the guide defining an aperture configured to receive the stock material.

7. A system, comprising:
the dunnage conversion machine of claim 1; and
a supply of the stock material.

8. A dunnage conversion machine, comprising:
a drive mechanism configured to deform a stock material into dunnage; and
a cutting mechanism comprising a shuttle, a cutting portion carried by the shuttle so that movement of the shuttle moves the cutting portion to cut the dunnage, and a motor assembly, the motor assembly including a rotatable crank configured to be coupled to the shuttle so that rotation of the crank moves the shuttle along a plane; wherein the shuttle is configured to be disengaged from the crank by moving the shuttle along the plane when the crank is in a first angular position in relation to the shuttle.

9. The dunnage conversion machine of claim 8, wherein:
the shuttle is configured to move the cutting portion along the plane to cut the dunnage as the crank moves from the first to a second angular position of the crank; and
the second angular position is offset from the first angular position by about 180 degrees.

10. The dunnage conversion machine of claim 8, wherein:
the shuttle is configured to move the cutting portion along the plane in a first direction;
the shuttle defines a track having a longitudinal axis oriented in a second direction substantially perpendicular to the first direction; and
the crank is configured to engage the shuttle by way of the track.

11. The dunnage conversion machine of claim 10, wherein:
the shuttle further defines an opening that adjoins the track;
the crank comprises a projection;
the track is configured to receive the projection; and
the shuttle is further configured to disengage from the crank when the projection aligns with the opening.

12. The dunnage conversion machine of claim 11, wherein the shuttle is further configured so that the projection aligns with the opening only when the crank is in the first or the second angular position.

13. A dunnage conversion machine, comprising:
a drive mechanism configured to deform a stock material into dunnage; and
a cutting mechanism comprising an anvil having a curvilinear convex surface a shuttle, and a cutting portion carried by the shuttle so that movement of the shuttle moves the cutting portion in relation to the anvil to cut the dunnage.

14. The dunnage conversion machine of claim 13, wherein:
the anvil is configured so that the dunnage material is pushed around the curvinlinear convex surface of the anvil as the cutting portion or the anvil moves to cut the dunnage.

15. The dunnage conversion machine of claim 14, wherein:
the anvil has an opening defined therein and configured to permit the dunnage to pass through anvil; and
the opening is defined at least in part by the convex surface.

16. The dunnage conversion machine of claim 13, wherein the curvilinear surface of the anvil comprises a sharp edge configured to cut the dunnage.

17. The dunnage conversion machine of claim 13, wherein the cutting mechanism further includes a magnet mounted on one of the cutting portion and the anvil and configured to magnetically and slidably couple the cutting portion and the anvil.

18. The dunnage conversion machine of claim 13, wherein: the anvil further includes a first and a second lateral surface; the anvil has an opening defined at least in part by the curvilinear convex surface and the first and second lateral surfaces, the opening is configured to permit the dunnage to pass through the anvil; and the anvil is configured so that the dunnage is pushed towards the first and second lateral surfaces as the cutting portion or the anvil moves to cut the dunnage.

* * * * *